US012572471B1

(12) United States Patent
Galvin et al.

(10) Patent No.: US 12,572,471 B1
(45) Date of Patent: Mar. 10, 2026

(54) MOBILE-OPTIMIZED MULTI-STAGE LLM WITH GENERALIZED THOUGHT CACHING

(71) Applicant: AtomBeam Technologies Inc., Moraga, CA (US)

(72) Inventors: Brian Galvin, Silverdale, WA (US); Alan McCord, Forney, TX (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/177,611

(22) Filed: Apr. 13, 2025

Related U.S. Application Data

(63) Continuation-in-part of application No. 19/051,193, filed on Feb. 12, 2025, now Pat. No. 12,387,050.

(51) Int. Cl.
  *G06F 40/30* (2020.01)
  *G06F 1/3212* (2019.01)
  *G06F 12/0811* (2016.01)
(52) U.S. Cl.
  CPC ........ *G06F 12/0811* (2013.01); *G06F 1/3212* (2013.01); *G06F 40/30* (2020.01); *G06F 2212/6042* (2013.01)
(58) Field of Classification Search
  CPC .... G06F 40/211; G06F 40/253; G06F 40/268; G06F 40/284; G06F 40/30; G06F 12/0811; G06N 3/08
  See application file for complete search history.

(56) References Cited

U.S. PATENT DOCUMENTS

| | | | | |
|---|---|---|---|---|
| 11,556,470 B2 * | 1/2023 | Lin | ...................... | G06F 12/121 |
| 12,223,456 B1 * | 2/2025 | Manohar | ................ | G06F 40/30 |

(Continued)

FOREIGN PATENT DOCUMENTS

| | | | | | |
|---|---|---|---|---|---|
| CN | | 111258929 A | * | 6/2020 | ........... G06F 12/121 |
| WO | WO-2019083599 A1 | | * | 5/2019 | ........... G06F 12/128 |
| WO | WO-2025184895 A1 | | * | 9/2025 | ......... G06F 12/0862 |

OTHER PUBLICATIONS

Title={Memory sharing for large language model based agents}, author={Gao, Hang and Zhang, Yongfeng}, 2024, journal={arXiv preprint arXiv:2404.09982}, pp. 1-14 (Year: 2024).*

(Continued)

*Primary Examiner* — Lamont M Spooner
(74) *Attorney, Agent, or Firm* — GALVIN PATENT LAW LLC; Brian R. Galvin; Erin L. Johnston

(57) ABSTRACT

A system and method for mobile-optimized natural language processing employs a three-tier thought caching architecture comprising a local device cache, a user-specific cloud cache, and a global generalized thought cache. The system processes prompts using a first large language model to generate thoughts, which are then processed with the prompt by a smaller model to produce responses. A thought generalizer identifies common reasoning patterns across users, removes personal information, and creates shareable abstracted thought structures. Mobile-specific optimizations include battery-aware execution scaling and predictive thought pre-caching. When offline, the system adapts existing cached thoughts to address new prompts. Hierarchical thought management organizes information at different abstraction levels, enabling effectively unlimited context while efficiently managing resources. This architecture provides sophisticated language processing on mobile devices with offline functionality while maximizing battery efficiency and maintaining privacy.

20 Claims, 18 Drawing Sheets

(56) References Cited

U.S. PATENT DOCUMENTS

| | | | | |
|---|---|---|---|---|
| 12,412,128 | B1* | 9/2025 | Moghaddam | G06N 3/006 |
| 12,499,065 | B1* | 12/2025 | Narawane | G06F 13/1663 |
| 12,505,131 | B2* | 12/2025 | Madisetti | G06F 16/3329 |
| 2002/0091801 | A1* | 7/2002 | Lewin | H04L 63/08 |
| | | | | 709/219 |
| 2008/0172529 | A1* | 7/2008 | Ringe | G06F 9/381 |
| | | | | 711/138 |
| 2018/0174055 | A1* | 6/2018 | Tirumale | H04L 51/04 |
| 2019/0174514 | A1* | 6/2019 | Ramesh | G06Q 50/40 |
| 2020/0034914 | A1* | 1/2020 | Boss | G06Q 30/0633 |
| 2020/0073983 | A1* | 3/2020 | Sen | G06F 16/243 |
| 2020/0285704 | A1* | 9/2020 | Rajani | G06N 3/09 |
| 2020/0336562 | A1* | 10/2020 | Luft | H04L 67/2885 |
| 2020/0351344 | A1* | 11/2020 | Das Gupta | H04L 41/16 |
| 2021/0073808 | A1* | 3/2021 | Gu | G06Q 20/3221 |
| 2021/0406224 | A1* | 12/2021 | Neufeld | G06F 16/1873 |
| 2022/0138156 | A1* | 5/2022 | Wang | H04L 67/568 |
| | | | | 707/740 |
| 2023/0214387 | A1* | 7/2023 | Jiang | H04L 67/1014 |
| | | | | 707/769 |
| 2023/0316006 | A1* | 10/2023 | Tunstall-Pedoe | G06N 3/0442 |
| | | | | 704/9 |
| 2024/0104391 | A1* | 3/2024 | Higgins | G06F 16/3329 |
| 2024/0160955 | A1* | 5/2024 | Zhao | G06F 16/3329 |
| 2024/0256965 | A1* | 8/2024 | Chung | G06N 20/00 |
| 2024/0354320 | A1* | 10/2024 | Procter | G06F 40/103 |
| 2024/0386015 | A1* | 11/2024 | Crabtree | G06F 16/9024 |
| 2024/0411809 | A1* | 12/2024 | Najafirad | G06F 16/7837 |
| 2024/0428008 | A1* | 12/2024 | Abraham | G06F 16/3329 |
| 2025/0021653 | A1* | 1/2025 | Sen | G06F 21/566 |
| 2025/0028882 | A1* | 1/2025 | Ataei | G06F 30/12 |
| 2025/0094455 | A1* | 3/2025 | Bista | G06F 16/3329 |
| 2025/0095035 | A1* | 3/2025 | Kuan | G06F 40/40 |
| 2025/0110457 | A1* | 4/2025 | Qiu | G05B 13/0265 |
| 2025/0111211 | A1* | 4/2025 | Qiu | G06N 3/096 |
| 2025/0117593 | A1* | 4/2025 | Lancioni | G06F 40/40 |
| 2025/0148203 | A1* | 5/2025 | Pan | G10L 15/26 |
| 2025/0165718 | A1* | 5/2025 | Seo | G06F 40/30 |
| 2025/0173554 | A1* | 5/2025 | Lancioni | G06N 3/0475 |
| 2025/0191369 | A1* | 6/2025 | Huang | G06F 40/284 |
| 2025/0200245 | A1* | 6/2025 | Cao | G06F 30/20 |
| 2025/0252641 | A1* | 8/2025 | Wu | G06T 13/40 |
| 2025/0252966 | A1* | 8/2025 | Ghosh | G10L 25/18 |
| 2025/0259041 | A1* | 8/2025 | Crabtree | G06N 3/042 |
| 2025/0259042 | A1* | 8/2025 | Crabtree | G06N 3/047 |
| 2025/0259043 | A1* | 8/2025 | Crabtree | G06N 3/042 |
| 2025/0259082 | A1* | 8/2025 | Crabtree | G06N 3/042 |
| 2025/0259085 | A1* | 8/2025 | Crabtree | G06N 5/01 |
| 2025/0299020 | A1* | 9/2025 | Yu | G06N 3/045 |
| 2025/0328560 | A1* | 10/2025 | Madisetti | G06F 16/3329 |
| 2025/0328752 | A1* | 10/2025 | Yu | G06N 3/063 |
| 2025/0335458 | A1* | 10/2025 | Lewis | G06F 16/252 |
| 2025/0342179 | A1* | 11/2025 | Gangumalla | G06F 16/31 |
| 2025/0342367 | A1* | 11/2025 | Shama | G06N 5/022 |
| 2025/0348737 | A1* | 11/2025 | Yu | G06N 3/063 |
| 2025/0348754 | A1* | 11/2025 | Masson | G06N 3/045 |
| 2025/0363311 | A1* | 11/2025 | Chandarana | G06Q 50/26 |
| 2025/0371041 | A1* | 12/2025 | Yang | G06F 16/322 |
| 2025/0371433 | A1* | 12/2025 | Bhat | G06N 20/00 |
| 2025/0377812 | A1* | 12/2025 | Palaniappan | G06F 3/0625 |
| 2025/0378396 | A1* | 12/2025 | Ezrielev | G06Q 10/047 |
| 2025/0390352 | A1* | 12/2025 | Crabtree | G06F 9/5027 |

OTHER PUBLICATIONS

Gim, In, et al.; "Prompt Cache: Modular Attention Reuse for Low-Latency Inference", arXiv:2311.04934v2, Apr. 2024.

* cited by examiner

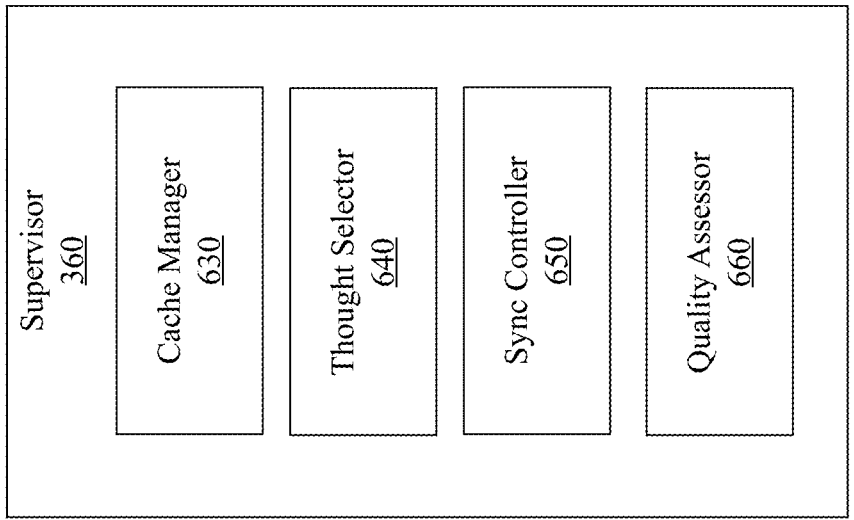
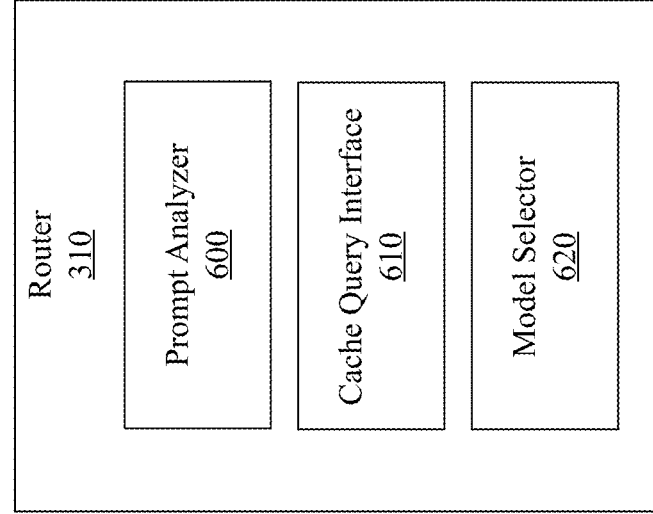
FIG. 6

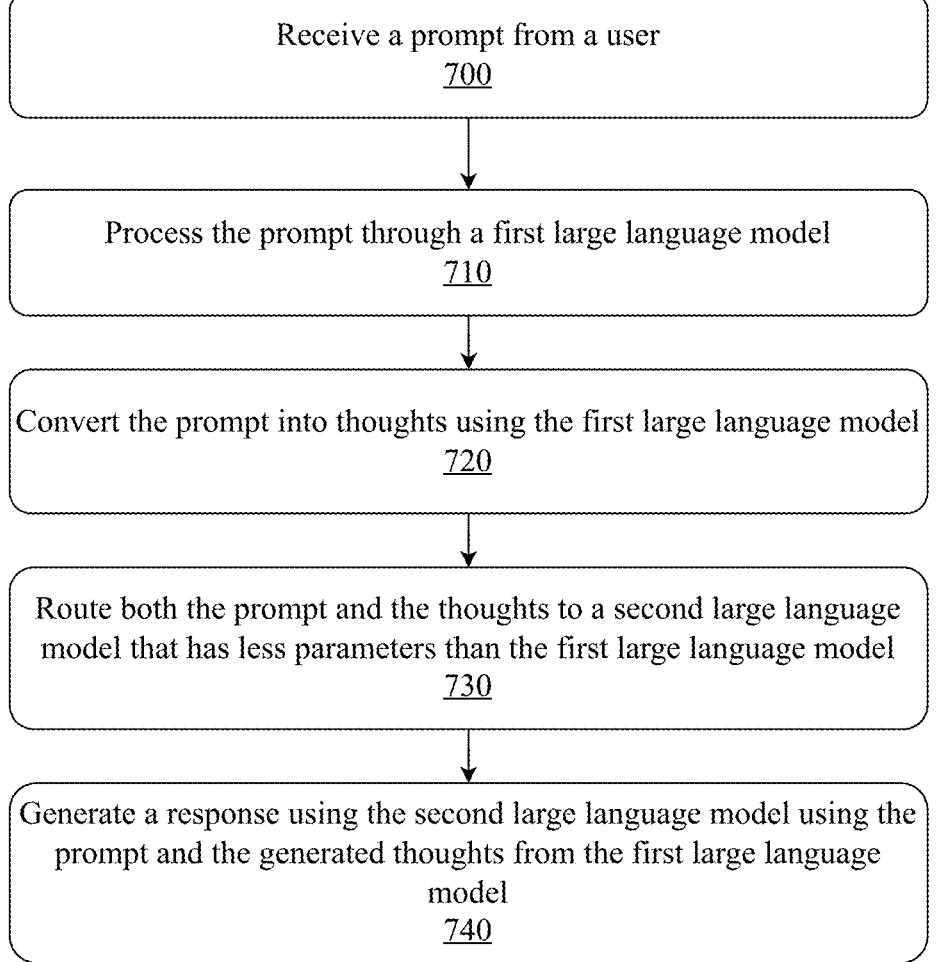

Receive a prompt from a user
700

Process the prompt through a first large language model
710

Convert the prompt into thoughts using the first large language model
720

Route both the prompt and the thoughts to a second large language model that has less parameters than the first large language model
730

Generate a response using the second large language model using the prompt and the generated thoughts from the first large language model
740

FIG. 7

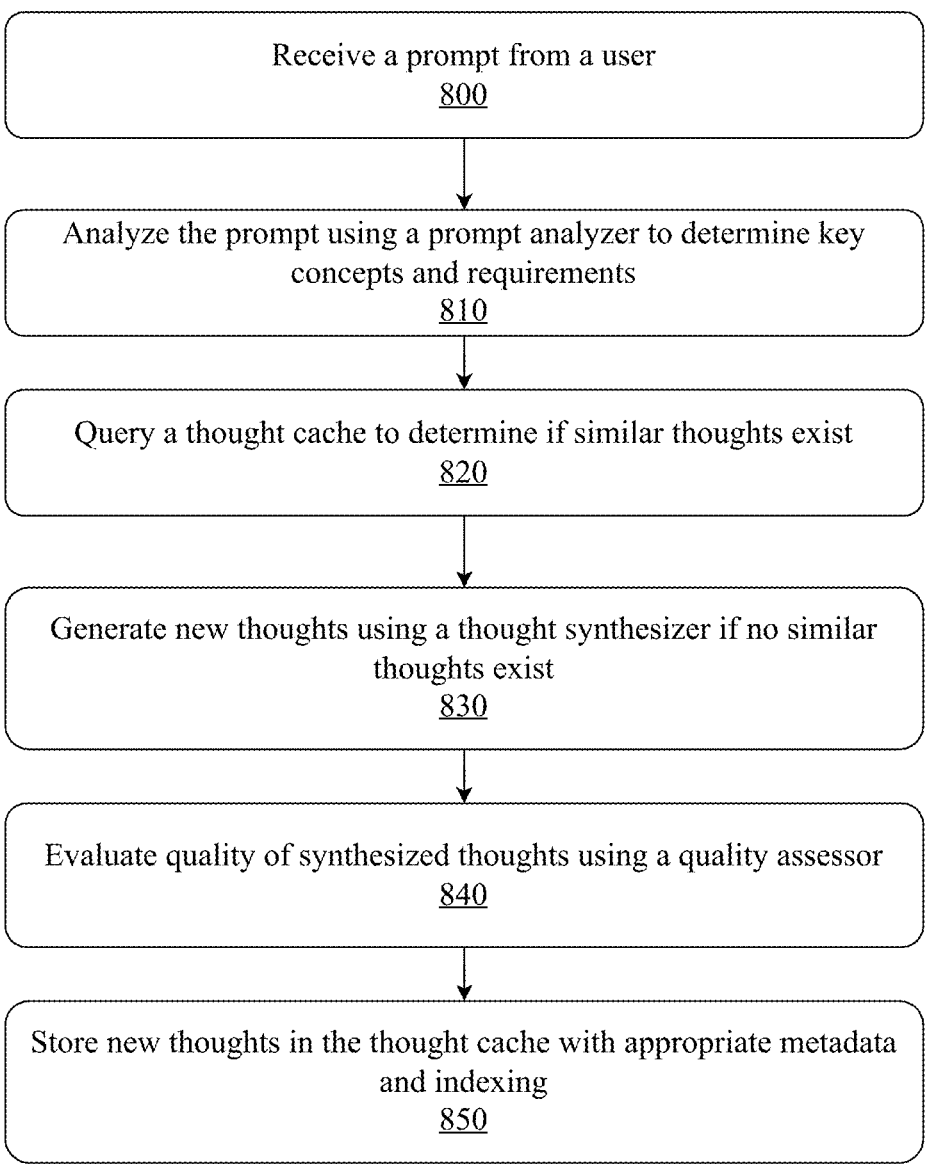

Receive a prompt from a user
800

Analyze the prompt using a prompt analyzer to determine key
concepts and requirements
810

Query a thought cache to determine if similar thoughts exist
820

Generate new thoughts using a thought synthesizer if no similar
thoughts exist
830

Evaluate quality of synthesized thoughts using a quality assessor
840

Store new thoughts in the thought cache with appropriate metadata
and indexing
850

FIG. 8

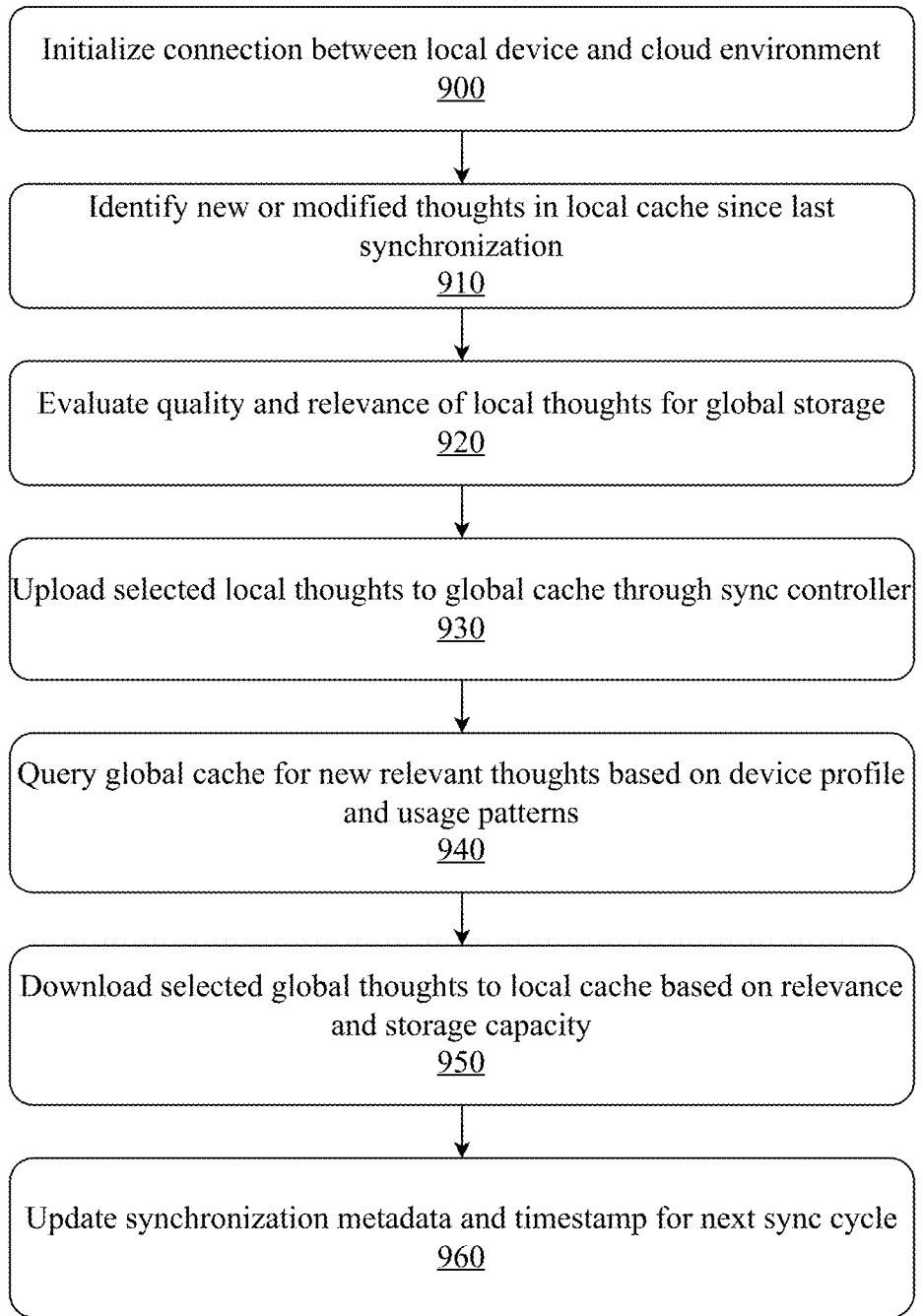

Initialize connection between local device and cloud environment
900

Identify new or modified thoughts in local cache since last synchronization
910

Evaluate quality and relevance of local thoughts for global storage
920

Upload selected local thoughts to global cache through sync controller
930

Query global cache for new relevant thoughts based on device profile and usage patterns
940

Download selected global thoughts to local cache based on relevance and storage capacity
950

Update synchronization metadata and timestamp for next sync cycle
960

FIG. 9

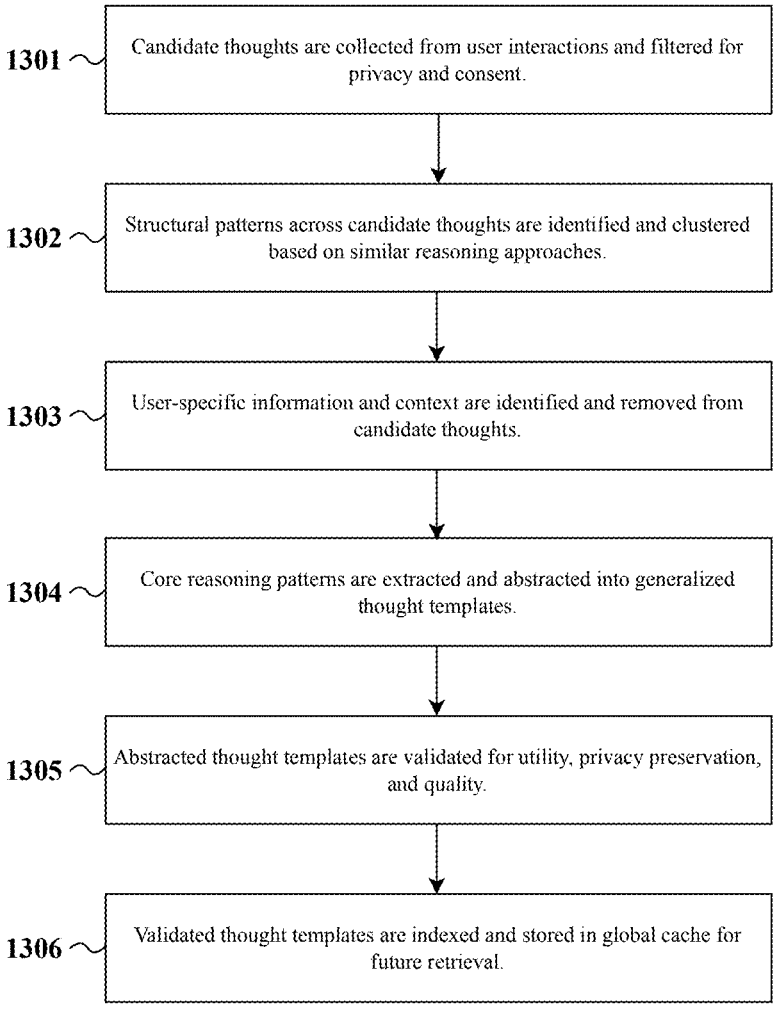

1301 — Candidate thoughts are collected from user interactions and filtered for privacy and consent.

1302 — Structural patterns across candidate thoughts are identified and clustered based on similar reasoning approaches.

1303 — User-specific information and context are identified and removed from candidate thoughts.

1304 — Core reasoning patterns are extracted and abstracted into generalized thought templates.

1305 — Abstracted thought templates are validated for utility, privacy preservation, and quality.

1306 — Validated thought templates are indexed and stored in global cache for future retrieval.

FIG. 13

MOBILE-OPTIMIZED MULTI-STAGE LLM WITH GENERALIZED THOUGHT CACHING

CROSS-REFERENCE TO RELATED APPLICATIONS

Priority is claimed in the application data sheet to the following patents or patent applications, each of which is expressly incorporated herein by reference in its entirety: Ser. No. 19/051,193

BACKGROUND OF THE INVENTION

Field of the Invention

The present invention relates to systems and methods for efficient natural language processing in mobile environments, specifically using a combination of mobile-optimized large and small language models with hierarchical thought caching capabilities to reduce computational overhead, optimize battery utilization, and maintain robust reasoning capabilities during both connected and offline operation.

Discussion of the State of the Art

Language models have evolved significantly in recent years, with modern architectures demonstrating remarkable capabilities in natural language processing, reasoning, and generation tasks. These large language models (LLMs) have become increasingly sophisticated, processing and generating human-like text across a wide range of applications. As these models have grown in capability, they have also grown substantially in size, with some models containing hundreds of billions of parameters.

Modern LLMs process input prompts through complex architectures consisting of encoder and decoder blocks with attention mechanisms. Recent developments have revealed that these models often engage in an internal reasoning process, generating "thoughts" about a prompt before producing a final response. These thoughts represent the model's step-by-step reasoning and analysis of the input prompt. While some models expose these thoughts to users, others keep them internal to the model's processing pipeline. These reasoning steps have proven important to the model's ability to provide accurate and contextually appropriate responses.

The computational resources required to run these large models present significant challenges for widespread deployment and real-time applications. The memory and processing requirements often necessitate specialized hardware and substantial computational infrastructure. Additionally, context windows in current architectures limit the amount of information that can be processed in a single session, constraining the model's ability to maintain long-term context and engage in extended conversations. While various solutions like retrieval-augmented generation have been proposed to address context limitations, these systems typically rely on document retrieval rather than leveraging the model's own reasoning processes.

The deployment of these models presents significant challenges in terms of scalability and accessibility. Current solutions often require either substantial local computing resources or constant connection to cloud services with significant computational capacity. This is particularly problematic for mobile devices, which face inherent constraints including limited processing power, restricted memory capacity, battery limitations, and intermittent network connectivity. The combination of these constraints severely limits the practical applications of advanced language models on mobile platforms, creating a substantial gap between the capabilities available in controlled environments and those accessible to users on mobile devices in real-world scenarios.

What is needed is a mobile-optimized system that efficiently leverages large language models' reasoning capabilities while reducing computational overhead, managing battery usage, functioning offline, and enabling privacy-preserving knowledge sharing across both local and cloud-based architectures.

SUMMARY OF THE INVENTION

The inventor has developed a system and method for a mobile-optimized multi-stage LLM with generalized thought caching. This invention presents an efficient system for language model operation on mobile devices that combines mobile-optimized large and small language models with a sophisticated three-tier thought caching architecture. At its core, the system uses a first large language model optimized for mobile execution to generate "thoughts"—intermediate reasoning steps about prompts—which can then be cached and reused. These thoughts, along with the original prompts, are processed through a smaller, more efficient language model to generate responses. The system implements a multi-tier thought caching architecture comprising a local device cache for storing user-specific thoughts and generalized thoughts, a user-specific cloud cache that securely stores the user's complete thought history encrypted with user-specific keys, and a global generalized thought cache that stores abstracted reasoning patterns applicable across multiple users. The architecture maintains full functionality when operating offline by adapting existing cached thoughts to address new prompts when no directly relevant thoughts are found and the mobile device lacks network connectivity. Through thought generalization techniques, the system identifies common reasoning patterns across users, removes personal information, and creates abstracted thought structures that can be shared globally while maintaining privacy.

According to a preferred embodiment, a computer system comprising a hardware memory is configured to execute software instructions stored on nontransitory machine-readable storage media that: receive a prompt from a user on a mobile device; process the prompt into a plurality of corresponding thoughts using a first large language model optimized for mobile execution; route both the prompt and the plurality of thoughts through a second large language model that has fewer parameters than the first large language model; associate each corresponding thought in the plurality of corresponding thoughts to a portion of the prompt; cache each associated corresponding thought in a multi-tier thought caching architecture comprising a local device cache, a user-specific cloud cache, and a global generalized thought cache; generate a response to the prompt by processing the plurality of thoughts and the prompt through the second large language model; and maintain full functionality when operating offline by adapting existing cached thoughts to address new prompts when no directly relevant thoughts are found and the mobile device lacks network connectivity, is disclosed.

According to another preferred embodiment, a method comprising: receiving a prompt from a user on a mobile device; processing the prompt into a plurality of corresponding thoughts using a first large language model optimized for mobile execution; routing both the prompt and the plurality of corresponding thoughts through a second large language model that has fewer parameters than the first large language model; associating each corresponding thought in the plurality of corresponding thoughts to a portion of the prompt; caching each associated corresponding thought in a multi-tier thought caching architecture; generating a response to the prompt by processing the plurality of corresponding thoughts and the prompt through the second large language model; and maintaining full functionality when operating offline by adapting existing cached thoughts to address new prompts when no directly relevant thoughts are found and the mobile device lacks network connectivity, is disclosed.

According to an aspect of an embodiment, the computer system is further configured to execute software instructions stored on the nontransitory machine-readable storage media that analyze the prompt using a prompt analyzer to determine key concepts and requirements, query the multi-tier thought caching architecture to determine if similar thoughts exist for the determined key concepts, and synthesize new thoughts when the similar thoughts exist but do not fully address the prompt requirements.

According to an aspect of an embodiment, the local device cache of the multi-tier thought caching architecture stores both user-specific thoughts and generalized thoughts, the user-specific cloud cache of the multi-tier thought caching architecture securely stores the user's complete thought history encrypted with user-specific keys, and the global generalized thought cache of the multi-tier thought caching architecture stores abstracted reasoning patterns applicable across multiple users.

According to an aspect of an embodiment, the computer system implements a thought generalizer that analyzes the plurality of corresponding thoughts generated across multiple users, removes user-specific information and context from the plurality of corresponding thoughts, abstracts a reasoning pattern into a generalized thought structure, and stores the generalized thought structure in the global generalized thought cache for access by all users.

According to an aspect of an embodiment, the computer system implements battery-aware execution scaling that dynamically adjusts a complexity of the first large language model based on a power state of the mobile device.

According to an aspect of an embodiment, the computer system organizes the cached associated corresponding thoughts into a hierarchical structure to enable effectively unlimited context while managing computational resources efficiently, the hierarchical structure comprising progressive levels of abstraction from detailed token-level information in recent interactions to highly abstracted thought structures applicable across multiple contexts.

According to an aspect of an embodiment, adapting the existing cached thoughts to address the new prompts comprises a transformation process that modifies thought patterns from one context to fit requirements of a current prompt.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

4

FIG. 6 is a block diagram illustrating exemplary components for a multi-state LLM with unlimited context, a router and a controller.

FIG. 7 is a flow diagram illustrating an exemplary method for natural language processing using a dual-model approach with thought generation.

FIG. 8 is a flow diagram illustrating an exemplary method for thought creation, evaluation, and storage within the system.

FIG. 9 is a flow diagram illustrating an exemplary method for synchronizing thought caches between local devices and a global cloud environment.

FIG. 13 is a method diagram illustrating the thought generalization process of mobile-optimized multi-stage LLM.

DETAILED DESCRIPTION OF THE INVENTION

Figure 1:
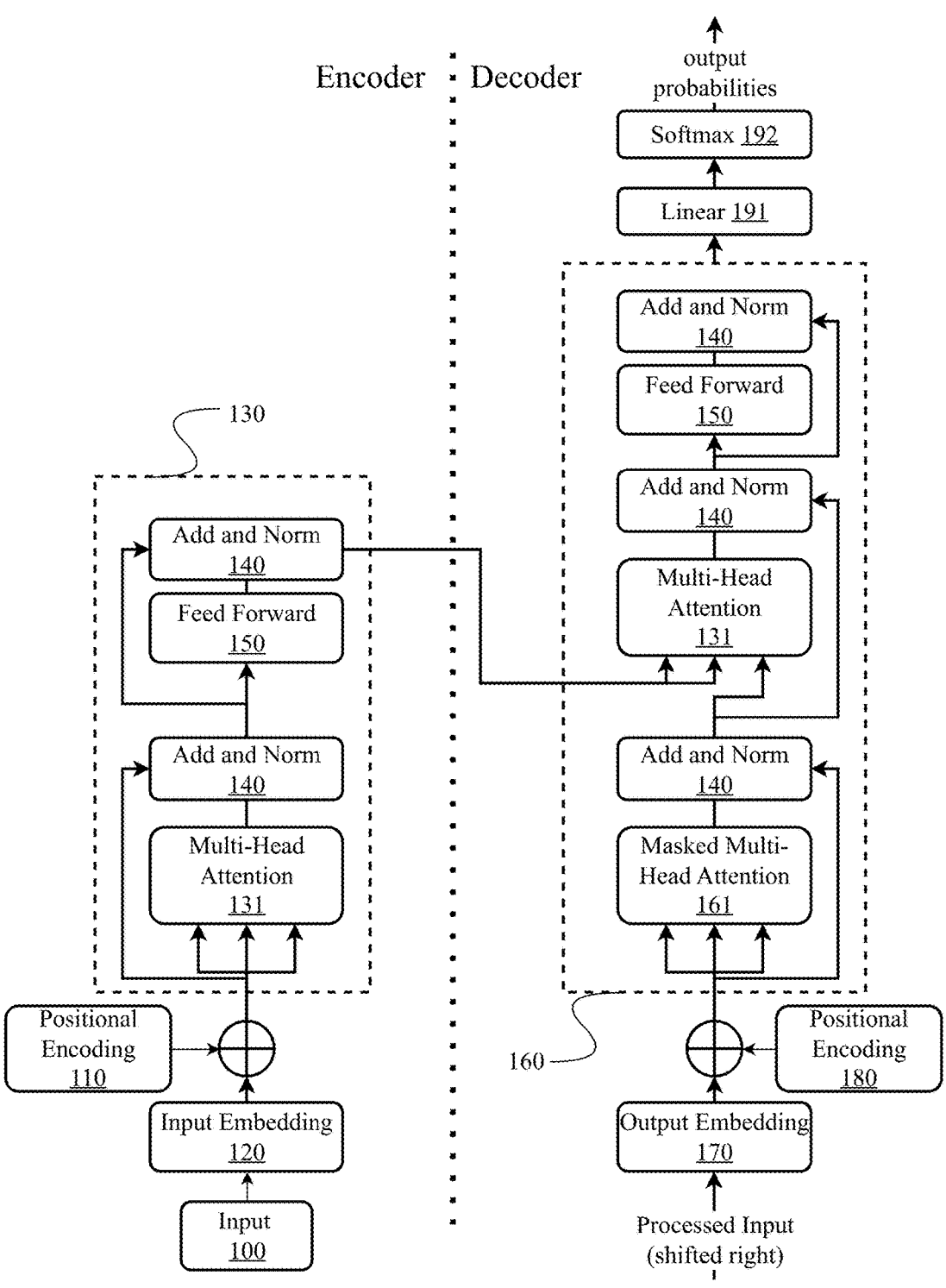
FIG. 1 (Prior Art) is a block diagram illustrating a common transformer architecture used in most large language models.

The inventor has conceived, and reduced to practice, a system and method for a mobile-optimized multi-stage LLM with generalized thought caching. This invention presents an advancement in efficient language model operation designed for mobile environments, building upon the foundation of multi-stage language model processing while introducing new approaches to thought generalization and mobile-specific optimizations. The system utilizes an architecture where prompts received on a mobile device are processed by a first large language model optimized for mobile execution to generate "thoughts"—intermediate reasoning steps that capture the model's analysis and understanding. These thoughts can be cached and reused within a three-tier thought caching architecture, eliminating the need to regenerate similar reasoning patterns for related prompts and enabling operation even when network connectivity is unavailable.

The multi-tier thought caching architecture consists of a local device cache that stores both user-specific thoughts and frequently accessed generalized thoughts, a user-specific cloud cache that preserves the user's complete thought history with appropriate encryption, and a global generalized thought cache that maintains abstracted reasoning patterns applicable across multiple users. This tiered approach balances the need for personalized, private thought storage with the efficiency benefits of shared reasoning patterns, while ensuring that mobile devices can operate regardless of connectivity status.

Through thought generalization techniques, the system identifies common reasoning patterns across multiple users, removes personally identifiable information and specific context, and abstracts these patterns into generalized thought structures that can be shared without compromising privacy. This generalization process involves pattern recognition to identify similar reasoning approaches, context removal techniques that strip away user-specific elements, and abstraction methods that transform specific thoughts into more universally applicable structures. By sharing these generalized thoughts across users, the system achieves efficiency improvements without requiring each user to independently generate similar reasoning patterns.

The system's mobile-specific optimizations address the constraints of mobile environments, including limited computational resources, battery constraints, and intermittent connectivity. Battery-aware execution scaling adjusts the complexity and resource utilization of language model components based on the device's current power state, implementing multiple execution profiles ranging from high-performance operation when charging to efficient processing when battery levels are low. Incremental thought synchronization optimizes network usage by prioritizing the transfer of high-value thoughts during brief connectivity periods, while predictive thought pre-caching anticipates user needs based on usage patterns and contextual cues, ensuring relevant thoughts are available locally even when connectivity is lost.

To enable extended context while managing the resource constraints of mobile devices, the system implements hierarchical thought management that organizes cached thoughts at different levels of abstraction. Rather than maintaining all historical context as raw tokens, the system progressively compresses older information into more abstract thought representations, preserving essential reasoning patterns and knowledge while reducing storage and processing requirements. This hierarchical approach comprises immediate context level for recent interactions, session context level for the current interaction session, historical context level for previous sessions, and generalized knowledge level for broadly applicable patterns. As information ages or becomes less immediately relevant, it transitions through these levels via context compression processes, while remaining accessible through context expansion when needed for current reasoning tasks.

The system's approach to offline functionality represents an advancement for mobile applications. When network connectivity is unavailable and no directly relevant thoughts exist in the local cache, the system employs adaptation strategies to modify existing cached thoughts to address new prompts. These strategies include generalizing specific thoughts to broader applications, combining multiple partially relevant thoughts to address complex queries, applying thought patterns from one domain to related domains through analogical reasoning, and transforming existing thoughts through modification of context, parameters, or application scope. These adaptation capabilities ensure that users receive responses even without network access, maintaining functionality during offline periods.

This architecture integrates with mobile device capabilities, incorporating contextual awareness through sensor data, supporting voice and visual input modalities, and adapting to the user's environment and activities. Privacy and security considerations are addressed through a hierarchical access control mechanism that maintains separation between personal thoughts in user-specific caches and anonymized thoughts in the global cache, with encryption for user-specific data both on-device and in the cloud.

Through these methods, the system combines the reasoning power of large language models with the efficiency requirements of mobile computing, delivering natural language processing capabilities with reduced computational overhead, offline operation, and optimized battery utilization. This approach enables deployment of advanced language model capabilities in resource-constrained mobile environments without sacrificing the quality of responses, representing an advancement in making language technologies accessible across a broader range of devices and usage scenarios.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "thought" refers to a discrete unit of reasoning or analysis generated by a large language model during its processing of an input prompt. A thought represents the model's intermediate reasoning steps, analysis, or considerations about the prompt before generating a final response. Thoughts are generated during a reasoning phase of the model's operation and contain the model's understanding, context analysis, and logical processing of the prompt. Unlike raw text or embeddings, thoughts encapsulate the model's processed reasoning in a form that can be cached, retrieved, and reused for similar prompts. Thoughts may be explicitly visible in model outputs or may be internally generated, and can be stored in various cache architectures including local and cloud-based systems. These cached thoughts can be combined with new prompts to generate responses using smaller language models, effectively preserving the reasoning capabilities of larger models while reducing computational overhead.

As used herein, "context" refers to both traditional sequence-based context where a language model processes a series of tokens representing prior interactions or information, and thought-based context where the model processes higher-level abstractions in the form of thought sequences. Traditional context operates at the token level, maintaining a history of specific words, phrases, and their relationships through mechanisms like attention windows. In contrast, thought-based context operates at a higher level of abstraction, where each thought represents a complex unit of reasoning or understanding. This dual nature of context allows the system to maintain contextual awareness both through detailed token-level information and through more abstract thought-level representations, enabling efficient processing of complex interactions while reducing the computational overhead typically associated with maintaining long token sequences. Thought-based context can compress what would traditionally require thousands of tokens into a smaller number of thought units, each capturing key reasoning patterns and conceptual relationships relevant to the interaction.

Two Stage LLM with Infinite Context System Architecture

FIG. 1 (Prior Art) is a block diagram illustrating a common transformer architecture used in most large language models. A transformer generally comprises an encoder (the components on the left side of the illustration) and a decoder (the components on the right side of the illustration).

The illustrated transformer comprises an encoder and a decoder. The encoder takes input embeddings and processes them through a stack of layers (represented as dashed box 130). Each layer consists of: positional encoding, which adds position information to the input embeddings; multi-head attention, which allows the model to attend to different parts of the input sequence; add and norm, which applies residual connection and layer normalization; feed forward, which is a fully connected feed-forward network; and add and norm which is another residual connection and layer normalization.

The power of the transformer model lies in the self-attention mechanism. This mechanism contributes to accelerated learning compared to traditional models such as long short-term memory models. Self-attention empowers the transformer model with the remarkable capability to meticulously scrutinize distinct segments of a given sequence or even encompass the entire contextual essence of a sentence. This profound contextual awareness enables the model to make predictions with an elevated degree of accuracy and relevance.

The transformer takes a processed vector as its input 100. The input embedding 120 to the encoder is a sequence of tokens, typically represented as integers. Each token is mapped to a learnable embedding vector of a fixed size. The embedding layer is a lookup table that converts each token into its corresponding dense vector representation. The embeddings are learned during training and capture semantic and syntactic relationships between tokens.

A dense vector representation, also known as a dense embedding or a continuous vector representation, is a way of representing data, particularly words or tokens, as dense vectors in a high-dimensional continuous space. In the context of natural language processing (NLP) and language models, dense vector representations are used to capture semantic and syntactic information about words or tokens. Each word or token is mapped to a fixed-size vector of real numbers, typically with hundreds or thousands of dimensions. Each word or token is represented by a vector of a fixed size, regardless of the length of the input sequence. The size of the vector is a hyperparameter that is determined during model design. The vectors exist in a continuous high-dimensional space, where each dimension represents a latent feature or aspect of the word or token. The continuous nature allows for capturing fine-grained relationships and similarities between words. The dense vector representations are learned during the training process of the model. The model learns to assign similar vectors to words that have similar meanings or occur in similar contexts. The dense vector representations aim to capture semantic and syntactic relationships between words. Words that have similar meanings or are used in similar contexts tend to have similar vector representations. Dense vector representations allow for performing algebraic operations on words, such as addition and subtraction. These operations can capture analogies and relationships between words, such as "prince"−"man"+"woman"≈"princess". Dense vector representations serve as input features for various downstream NLP tasks, such as text classification, sentiment analysis, named entity recognition, and machine translation. The dense representations provide a rich and informative input to the models, enabling them to learn patterns and make predictions. Some popular examples of dense vector representations include, but are not limited to, Word2Vec, Global Vectors for Word Representations (GloVe), FastText, and BERT.

After the input embedding layer, positional encoding 110 is added to the input embedding to provide position information to the model. Since the Transformer architecture doesn't have inherent recurrence or convolution, positional encodings help capture the order and relative positions of tokens. The positional encodings are typically sine and cosine functions of different frequencies, allowing the model to learn relative positions. The positional encodings have the same dimensionality as the input embeddings and are summed with them.

The encoder utilizes a multi-head attention mechanism 131 which is a key component of the transformer architecture. It allows the encoder to attend to different parts of the input sequence and capture dependencies between tokens. The attention mechanism computes three matrices: query (Q), key (K), and value (V). The query, key, and value matrices are obtained by linearly projecting the input embeddings using learned weight matrices. The attention scores are computed by taking the dot product of the query matrix with the transpose of the key matrix, followed by scaling and applying a softmax function. The attention scores determine the importance of each token in the input sequence for a given position. The value matrix is then multiplied with the attention scores to obtain the weighted sum of the values, which forms the output of the attention mechanism. Multi-head attention splits the query, key, and value matrices into multiple heads, allowing the model to attend to different aspects of the input simultaneously. The outputs from each head are concatenated and linearly projected to obtain the final output of the multi-head attention layer 131.

After the multi-head attention layer, a residual connection is applied, followed by layer normalization at add and norm 140. The residual connection adds the input embeddings to the output of the attention layer, helping the model learn faster and deeper. Layer normalization normalizes the activations across the features, stabilizing the training process.

While traditional multi-head attention mechanisms contributes to accelerated learning compared to models like LSTMs, innovations like multi-head Latent Attention (MLA) further enhance efficiency through low-rank key-value joint compression. MLA achieves this by compressing the key-value pairs into a latent vector, significantly reducing the key value cache required during inference while maintaining or improving performance compared to standard multi-head attention mechanism. The attention mechanism still empowers the model to scrutinize distinct segments of sequences, but MLA does so while requiring only a fraction of the computational resources The feed forward layer 150 is a fully connected neural network applied to each position of the encoder's hidden states. It consists of two linear transformations with a Rectified Linear Unit (ReLU) activation function in between. The purpose of the feed forward 150 layer is to introduce non-linearity and increase the model's capacity to learn complex representations. The output of the feed forward 150 layer has the same dimensionality as the input embeddings. A residual connection and layer normalization 140 are applied after the feed forward 150 layer.

The encoder layers 130 are stacked Nx times, where N is a hyperparameter that determines the depth of the Encoder. Each layer follows the same structure: multi-head attention, add & norm, feed forward, and add & norm. By stacking multiple encoder layers, the model can capture hierarchical and long-range dependencies in the input sequence. The output of the final encoder layer represents the encoded input sequence, which is then passed to the decoder for generating the output sequence.

The decoder generates the output probabilities. It has a similar structure to the Encoder, with a few additions. The decoder takes output embeddings and processes them through a stack of layers (represented as dashed box 160). The output embedding layer 170 takes the previous processed input tokens (shifted right by one position) and converts them into dense vectors. Each token is mapped to a learnable embedding vector of a fixed size. The embedding vectors capture semantic and syntactic relationships between tokens.

Positional encoding 180 is added to the output embedding 170 to provide position information to the model. Since the transformer architecture does not have inherent recurrence or convolution, positional encodings help capture the order and relative positions of tokens. The positional encodings are typically sine and cosine functions of different frequencies, allowing the model to learn relative positions.

The masked multi-head attention 161 mechanism prevents the model form attending to future tokens. This layer performs self-attention on the decoder's input sequence. It allows the decoder to attend to different parts of its own input sequence. The attention is "masked" to prevent the decoder from attending to future tokens, ensuring that the predictions are based only on the previously generated tokens. Multi-head attention splits the input into multiple heads, allowing the model to attend different aspect of the input simultaneously.

After the masked multi-head attention, a residual connection is applied follows by layer normalization via add and norm 140. The residual connection adds the input to the output of the attention layer, helping the model learn faster and deeper. Layer normalization normalizes the activations across the features, stabilizing the training process.

The multi-head attention 131 layer performs attention between the decoder's hidden states and the encoder's output. It allows the decoder to attend to relevant parts of the input sequence based on the encoder's representations. The attention weights are computed based on the compatibility between the Decoder's hidden states and encoder's outputs.

Another add and norm 140 layer is then followed by feed forward network 150. This a fully connected feed-forward network applied to each position of the decoder's hidden states. It consists of two linear transformations with a Rectified Linear Unit (ReLU) activation in between. The feed forward layer helps the model capture non-linear interactions and increases the model's capacity.

Another add and norm 140 layer is followed by linear 191 and softmax 192 layers. The final hidden states of the decoder are passed through a linear transformation to project them into the vocabulary space. Vocabulary space refers to the set of all unique tokens or words that the model can generate or predict. In the context of language models, the vocabulary is a predefined set of tokens that the model is trained on and can output. When the decoder's final hidden states are passed through a linear transformation, they are projected into a vector space with the same dimensionality as the size of the vocabulary. Each dimension in this space corresponds to a specific token in the vocabulary. For example, the model has a vocabulary of 10,000 unique tokens. The linear transformation would project the decoder's hidden states into a 10,000-dimensional vector space. Each element in this vector represents the model's predicted probability or score for the corresponding token in the vocabulary.

A softmax function is applied to the projected values (vectors) to generate output probabilities over the vocabulary. The softmax function normalizes the values so that they sum up to 1, representing a probability distribution over the vocabulary. Each probability indicates the likelihood of a specific token being the next output token. The token with the highest probability is selected as the next output token. During the model's training, the objective is to maximize the probability of the correct next token given the input sequence and the previously generated tokens. The model learns to assign higher probabilities to the tokens that are more likely to appear based on the context. At inference time, the token with the highest probability in the vocabulary space is selected as the next output token. This process is repeated iteratively, with the generated token being fed back into the decoder as input for the next step, until a stopping criterion is met (e.g., reaching a maximum length or generating an end-of-sequence token). The size and composition of the vocabulary can vary depending on the specific task and the data the model is trained on. It can include words, sub-words, or even characters, depending on the tokenization strategy used.

The decoder layers 160 can be stacked Nx times, allowing the model to capture complex dependencies and generate coherent output sequences.

This transformer architecture allows the model to process input sequences, capture long-range dependencies, and generate output sequence based on the encoded input and the previously generated tokens.

There are at least three variations of transformer architecture that may enable an LCM. A first such variation comprises Auto-Encoding Models. In autoencoders, the decoder portion of the transformer is discarded after pre-training and only the encoder is used to generate the output. The popular BERT and RoBERTa models are examples of models based on this architecture and perform well on sentiment analysis and text classification. These types of models may be trained using a process called masked language modeling (MLM).

The primary goal of an autoencoder is to learn efficient representations of input data by encoding the data into a lower-dimensional space and then reconstructing the original data from the encoded representation. Autoencoders are trained in an unsupervised manner, meaning they don't require labeled data. They learn to capture the underlying structure and patterns in the input data without explicit guidance. An autoencoder consists of two main components: an encoder and a decoder. The encoder takes the input data and maps it to a lower-dimensional representation, often referred to as the latent space or bottleneck. The decoder takes the latent representation and tries to reconstruct the original input data. Autoencoders can be used for dimensionality reduction by learning a compressed representation of the input data in the latent space. The latent space has a lower dimensionality than the input data, capturing the most salient features or patterns. The training objective of an autoencoder is to minimize the reconstruction error between the original input and the reconstructed output. The model learns to encode and decode the data in a way that preserves the essential information needed for reconstruction. Variants and extensions of autoencoders can include denoising autoencoders, variational autoencoders (VAEs) which introduce a probabilistic approach to autoencoders wherein they learn a probabilistic encoder and decoder, allowing for generating new samples from the learned latent space, and conditional autoencoders which incorporate additional conditions or labels as input to the encoder and decoder, enabling the generation of samples conditioned on specific attributes.

Autoencoders can have various applications. Autoencoders can be used to detect anomalies by measuring the reconstruction error. Anomalous samples tend to have higher reconstruction errors compared to normal samples. Autoencoders can be used as a pre-training step to learn meaningful features from unlabeled data. The learned features can then be used for downstream tasks like classification or clustering. Additionally, or alternatively, autoencoders, particularly VAEs, can be used as generative models to generate new samples similar to the training data by sampling from the learned latent space. It's worth noting that while autoencoders can be effective for certain tasks, they have some limitations. They may struggle to capture complex dependencies and may generate blurry or less sharp reconstructions compared to other generative models like Generative Adversarial Networks (GANs).

Another type of variation is the auto-regressive model which feature the use of only the decoder portion of the transformer architecture. In autoregressive architectures, the decoder portion of the transformer is retained and the encoder portion is not used after model pre-training. Auto-regressive models are a class of models that generate outputs by predicting the next element based on the previously generated elements. In the context of the Transformer architecture and language modeling, auto-regressive models are commonly used for tasks such as text generation, machine translation, and language understanding.

Auto-regressive models generate outputs sequentially, one element at a time. In the case of language modeling, the model predicts the next word or token based on the previous words or tokens in the sequence. The prediction of the next element is conditioned on the previously generated elements. The model learns the conditional probability distribution $P(x_t|x\_1, x\_2, \ldots, x\_{t-1})$, where $x_t$ is the element at position t, and $x\_1, x\_2, \ldots, x\_{t-1}$ are the previously generated elements. The transformer architecture, particularly the decoder component, is well-suited for auto-regressive modeling. The decoder generates the output sequence one element at a time, conditioned on the previously generated elements and the encoded input sequence from the encoder. In the transformer decoder, the self-attention mechanism is masked to prevent the model from attending to future positions during training. This masking ensures that the model relies only on the previously generated elements to make predictions, following the auto-regressive property. During training, the transformer decoder uses a technique called teacher forcing. Instead of feeding the model's own predictions as input for the next step, the ground truth target sequence is used. This helps the model learn to generate the correct output sequence based on the input sequence and the previous target tokens. During inference or generation, the transformer decoder generates the output sequence one element at a time. At each step, the model takes the previously generated elements as input and predicts the next element. This process continues until a stopping criterion is met, such as reaching a maximum sequence length or generating an end-of-sequence token. Auto-regressive models, including the transformer, have achieved state-of-the-art performance in language modeling tasks. They excel at capturing the statistical properties and dependencies in sequential data, making them effective for generating coherent and fluent text.

While text generation is the most suitable use case of auto-regressors, they perform exceptionally well on a wide variety of tasks. Most modern LLMs are auto-regressors including, for example, the popular GPT series of LLMs, BERT, and XLNet.

The third variation of the transformer model is the sequence-to-sequence model which utilizes both the encoder and decoder portions of the transformer and can be trained in multiple ways. One of the methods is span corruption and reconstruction. These models are, generally, best suited for language translation. The T5 and BART family of models are examples of sequence-to-sequence models.

Figure 2:
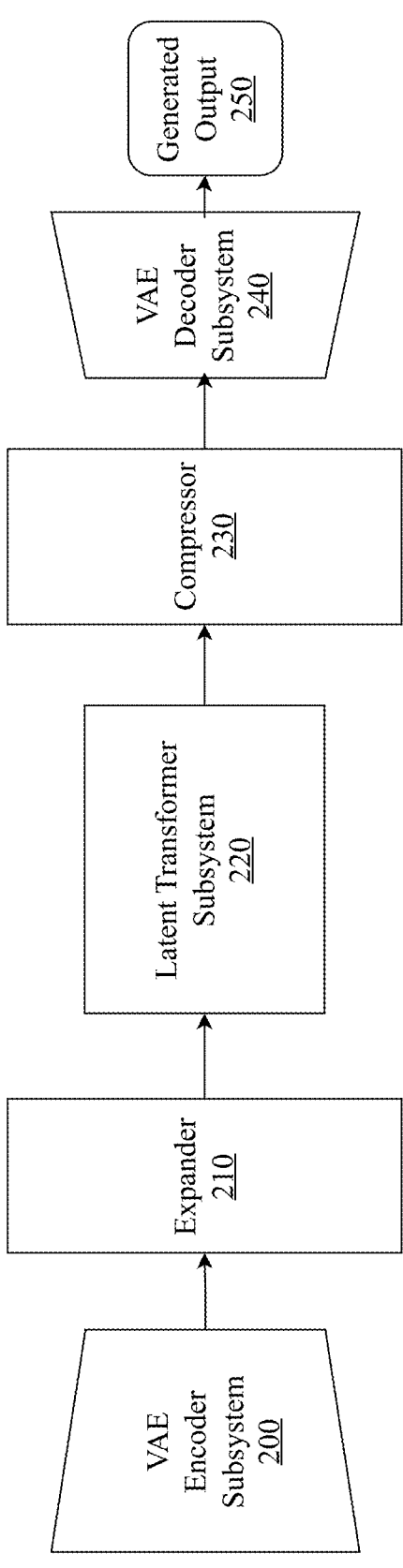
FIG. 2 is a block diagram illustrating an exemplary architecture for a latent transformer, where the transformer operates on latent space vector representations of an input.

FIG. 2 is a block diagram illustrating an exemplary architecture for a latent transformer, where the transformer operates on latent space vector representations of an input. Central to a latent transformer is a latent transformer subsystem 220, which serves as the central processing unit responsible for learning the underlying patterns, relationships, and dependencies within the input data. Latent transformer subsystem 220 leverages advanced techniques such as self-attention mechanisms and multi-head attention to capture the complex interactions and sequences in the data, enabling it to generate accurate and context-aware outputs.

The input to latent transformer subsystem 220 is provided by a VAE (Variational Autoencoder) encoder subsystem 200. VAE encoder subsystem 600 is responsible for encoding an input into a lower-dimensional latent space representation. VAE encoder subsystem 200, learns to compress the data into a compact latent space representation while preserving the essential features and characteristics of the input. Latent space vectors produced by the VAE encoder subsystem 200 may be further processed by an expander 210, which increases the dimensionality of the input data to a point where the vectors can be efficiently processed by latent transformer subsystem 220.

A latent space representation of the input generated by VAE encoder subsystem 200 serves as the input to latent transformer subsystem 220. Latent transformer subsystem 220 operates in this latent space, leveraging the compressed and informative representation to learn the complex patterns and relationships within the data. By working in the latent space, latent transformer subsystem 220 can efficiently process and model the data, capturing the intricate dependencies and generating accurate and meaningful outputs.

Once latent transformer subsystem 220 has processed the latent space representation, the generated output is passed through a VAE decoder subsystem 240. VAE decoder subsystem 240 is responsible for decoding the latent space representation back into the original data space. Prior to processing by VAE decoder subsystem 240, latent transformer subsystem 220 outputs may be compressed back to an original size before being processed by the expander 210 by being processed by a compressor 230. VAE decoder subsystem 240 learns to reconstruct the original data from the latent space representation, ensuring that the generated output is coherent and meaningful.

The reconstructed output from VAE decoder subsystem 240 is provided as a compressed generated output 250. The compressed generated output 250 represents the final result of the latent transformer, which is a compressed version of the original input.

VAE encoder subsystem 200 and VAE decoder subsystem 240 play large roles in the overall functioning of the latent transformer. VAE encoder subsystem 200 enables the system to learn a compressed and informative representation of the input data in the latent space, while the VAE decoder subsystem 240 ensures that the compressed generated output 250 is coherent and meaningful by reconstructing it back into the original data space. The combination of these subsystems allows the latent transformer to focus on learning the complex patterns and relationships within the data, leading to accurate and context-aware outputs.

The specific architectures and parameters of VAE encoder subsystem 200, latent transformer subsystem 220, and VAE decoder subsystem 240 can be customized and adapted based on the characteristics and requirements of the input data and the specific task at hand. The modular design of the system allows for flexibility and extensibility, enabling the integration of different architectures, attention mechanisms, and training techniques to optimize the performance and efficiency of the latent transformer.

Figure 3:
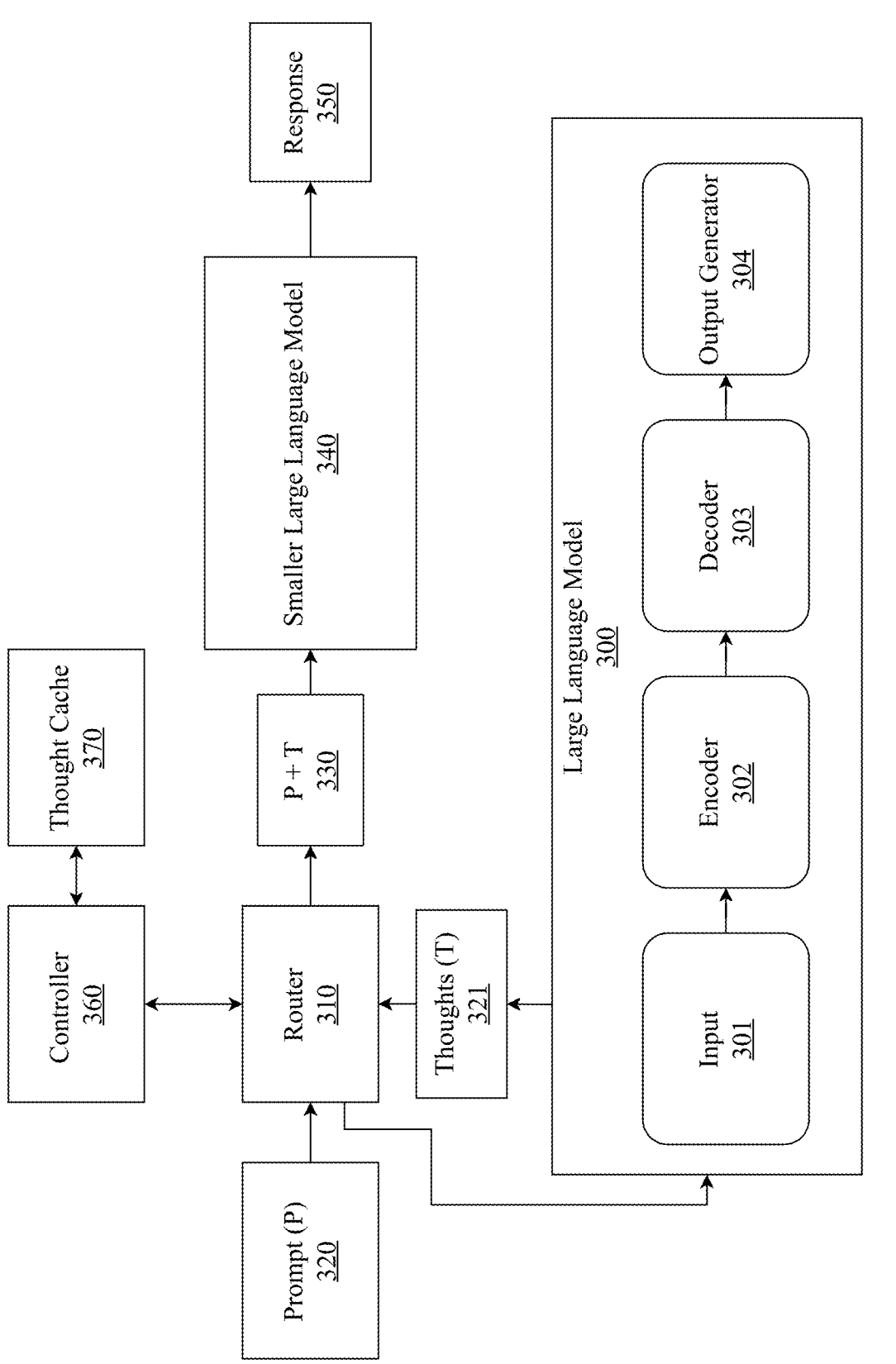
FIG. 3 is a block diagram illustrating an exemplary system architecture for a multi-state LLM with unlimited context.

FIG. 3 is a block diagram illustrating an exemplary system architecture for a multi-state LLM with unlimited context. The system includes a large language model 300, a router 310, a controller 360, a thought cache 370, and a smaller language model 340 that work together to process prompts and generate responses while optimizing computational resources.

The system receives an initial prompt (P) 320 through the router 310. The router serves as the central control component, determining whether to utilize the large language model 300 or access the thought cache 370 through the controller 360. Upon receiving a prompt, the router first queries the thought cache to determine if relevant thoughts exist for similar prompts.

The large language model 300 includes an input component 301, an encoder 302, a decoder 303, and an output generator 304. The large language model 300 can utilize various internal architectures, including but not limited to traditional transformer cores (as shown in FIG. 1) or latent transformer cores (as shown in FIG. 2). The model's attention mechanisms can be implemented using either standard multi-head attention (MHA) or multi-head latent attention (MLA), with the overall system functioning identically regardless of the specific attention mechanism chosen. When using MLA, the model benefits from reduced KV cache requirements during inference while maintaining performance comparable to or better than traditional MHA implementations. When the router determines that cached thoughts are not available or suitable, the prompt is processed through the large language model 300. During this processing, the model enters a reasoning phase where it generates thoughts (T) 321 about the prompt. These thoughts represent the model's analysis and reasoning about the prompt before generating a final response.

The controller 360 manages interaction with the thought cache 370, which can be implemented as either a local or cloud-based storage system. The thought cache stores previously generated thoughts in a vector database format, allowing for efficient retrieval of relevant thoughts for similar prompts. The cache can maintain both session-specific thoughts for temporary storage and long-term thoughts for persistent knowledge.

When thoughts are either generated by the large language model or retrieved from the cache, they are combined with the original prompt to create a prompt and thought combination (P+T) 330. This combination is then routed to the smaller language model 340, which requires significantly fewer computational resources than the large model. The smaller model processes the P+T 330 combination to generate the final response 350.

In operation, for example, if a user submits a prompt asking about climate change impacts, the router first checks the thought cache for relevant existing thoughts. If suitable thoughts exist, they are retrieved and combined with the prompt. If no relevant thoughts are found, the large model processes the prompt to generate new thoughts about climate science, global impacts, and relevant data. These thoughts, combined with the original prompt, are then processed by the smaller model 340 to generate a concise, relevant response. The new thoughts are also cached for future use. To demonstrate how thoughts are created, imagine the prompt "What do you think is the future of string theory, particularly given the spectacular failure of supersymmetry at LHC" being entered into the LLM DeepSeek. During the reasoning phase, the model returns to the user the following thoughts:

"Okay, the user is asking about the future of string theory in light of supersymmetry not being found at the LHC. Let me start by recalling what I know about string theory and SUSY.

String theory relies heavily on supersymmetry because SUSY helps stabilize the extra dimensions and makes the math work better. But the LHC hasn't found any superpartners, which challenges some of the more popular SUSY models. However, I should note that SUSY isn't the only part of string theory. There are versions without it, like bosonic string theory, but those aren't as developed or realistic.

The user might be implying that since SUSY isn't found, string theory is in trouble. I need to address that but also explain why it's not the whole story. Maybe mention that SUSY could still exist at higher energy scales beyond LHC's reach. Also, string theory has other applications beyond particle physics, like in condensed matter or quantum gravity.

I should break down the response into points. First, clarify the relationship between SUSY and string theory. Then discuss the LHC results and their implications. Talk about other areas where string theory contributes, like holography or black hole physics. Mention alternatives within string theory that don't rely on low-energy SUSY. Also, touch on the possibility of future experiments or theoretical breakthroughs.

Need to be balanced. Acknowledge the challenges but also the potential. Avoid being too dismissive or overly optimistic. Maybe conclude by saying the future is uncertain but still active in different areas. Check if there are recent developments post-LHC that I should consider, but since the user didn't specify, stick to general points.

Make sure to explain technical terms like "landscape" or "holography" briefly. Keep the language accessible but precise. The user might be someone with a basic understanding of physics, possibly a student or enthusiast. They want to know if string theory is still viable and where it's headed. They might also be interested in how scientific theories adapt when experimental evidence is lacking.

In summary, structure the answer to address the SUSY issue, discuss other aspects of string theory, mention alternative research directions, and conclude with the ongoing relevance despite challenges. Ensure each point flows logically and answers the user's concern about the theory's future post-LHC results." Using the above generated thoughts, model generated a response to the user's query.

The above thoughts represent T in the accompanying FIG. 3. By extracting thoughts generated by a model in their reasoning phase and passing both those thoughts and the initial prompt through a substantially smaller model with less parameters, the same response may be given while using much less energy.

The system supports multiple cache architectures, including but not limited to local device storage for personal use and cloud-based storage for enterprise applications. This allows for knowledge sharing across users while maintaining appropriate privacy and access controls. Multiple specialized caches can exist for different domains or use cases, such as financial analysis or scientific research.

The system supports multiple specialized cache architectures that enable domain-specific knowledge storage and AI agent collaboration. These architectures include but are not limited to local device caches for personal use, edge caches for specific AI agents, and distributed cloud-based caches for enterprise applications. Each specialized cache maintains its own thought organization optimized for its domain—for instance, a financial analysis cache might structure thoughts around market patterns and risk assessment frameworks, while a scientific research cache might organize thoughts based on experimental methodologies and theoretical frameworks. AI agents can be assigned primary affinity to specific specialized caches while maintaining ability to access other caches when needed. For example, a financial analysis agent might primarily interact with the financial cache but could access the scientific research cache when analyzing biotechnology investments. The system implements cache-specific validation rules and quality metrics tailored to each domain's requirements—financial thoughts might require numerical accuracy validation, while scientific thoughts might undergo peer-review-style verification by other AI agents. These specialized caches can operate independently or in interconnected hierarchies, with bridge agents managing thought transfer between different domains. Enterprise deployments can maintain multiple parallel specialized caches with varying access levels, enabling selective knowledge sharing while preserving security boundaries. For instance, a pharmaceutical company might maintain separate but interconnected caches for public research, proprietary development, and regulatory compliance, with AI agents navigating these boundaries based on clearance levels and task requirements.

The system achieves effectively unlimited context windows through a combination of thought abstraction and hierarchical memory management. Rather than attempting to maintain extended token sequences, the system is capable of converting contextual information into thought representations that capture higher-level patterns and relationships. These thoughts serve as compressed encodings of context, where each thought unit may encapsulate understanding that would traditionally require thousands of tokens to represent.

In one embodiment, the system implements a multi-tier thought storage architecture where context exists simultaneously at multiple levels of abstraction. The most recent context maintains detailed thought representations with full fidelity, while older context is progressively synthesized into more abstract thought patterns that capture essential relationships and understanding while reducing storage requirements. This progressive abstraction allows the system to maintain effectively unlimited context while managing computational resources efficiently.

When processing new prompts, router 310 analyzes both recent detailed thoughts and older abstract thoughts to identify relevant context. A thought synthesizer 430 can then combine these different levels of abstraction to generate new thoughts that incorporate both immediate context and long-term understanding. This multi-level synthesis enables the system to maintain contextual coherence across extended interactions without requiring linear scaling of computational resources.

Thought cache 370 implements indexing structures that maintain temporal relationships between thoughts while enabling efficient retrieval based on relevance. Unlike traditional attention mechanisms that must process entire token sequences, the system can directly access relevant thoughts across any temporal distance through its hierarchical indexing system. This capability allows the model to maintain contextual awareness across arbitrarily long sequences while keeping retrieval costs nearly constant.

In one embodiment, thought cache 370 implements multiple storage tiers that automatically organize thoughts based on their temporal relevance and utilization patterns. In its primary tier, the thought cache maintains recent thoughts with their complete reasoning chains and relationship mappings intact. As these thoughts age within the cache, specialized consolidation mechanisms within the cache combine related thoughts into more efficient meta-thoughts that preserve essential reasoning while reducing storage overhead.

Thought cache 370 monitors access patterns and triggers consolidation events when thought clusters meet specific temporal or utilization thresholds. During these events, thought cache 370 analyzes thought clusters using its built-in synthesis capabilities to generate consolidated meta-thoughts. These meta-thoughts capture insights and relationships from the original thought cluster while requiring significantly less storage space. For example, a sequence of thoughts about various machine learning algorithms might consolidate into a meta-thought capturing their comparative advantages and key implementation considerations.

Intelligence within thought cache 370 adapts consolidation timing based on thought utility metrics. Thought cache 370 tracks each thought's retrieval frequency, synthesis participation, and relationship density with other thoughts. Thoughts demonstrating high utility retain their detailed form longer, while less frequently accessed thoughts undergo earlier consolidation. This adaptive approach ensures that frequently needed reasoning patterns remain readily available in their most useful form.

Thought cache's 370 hierarchical storage structure spans multiple performance tiers, from high-speed memory for recent and frequently accessed thoughts to more economical storage for consolidated meta-thoughts. Thought cache 370 may migrate thoughts between these tiers based on usage patterns and age, optimizing storage resource utilization while maintaining rapid access to relevant contextual information. This tiered structure enables the cache to efficiently manage large volumes of thoughts while keeping the most pertinent information readily accessible.

Thought cache 370 implements a universal thought representation format that enables consistent interpretation across different language models and reasoning contexts. This standardization occurs through a formal thought schema that defines how reasoning steps, logical relationships, and contextual dependencies are encoded. Each thought contains structured fields for core reasoning components, metadata describing the thought's context and assumptions, and explicit markers for temporal and logical dependencies. This structured format ensures that thoughts remain interpretable regardless of which model originally generated them or which model ultimately consumes them.

Before a cached thought is applied to a new context, the system may perform an automated compatibility analysis. This analysis examines both the structural alignment between the cached thought and the current context, and the semantic applicability of the reasoning pattern. The system maintains model-specific adapters that can transform thoughts between different models' preferred reasoning styles while preserving the core logical structure. These adapters handle variations in formatting, vocabulary, and reasoning granularity, ensuring smooth thought transfer between models with different characteristics.

The cache incorporates a contextual validation layer that assesses thought applicability before reuse. When retrieving a cached thought, this layer examines the current prompt's context against the thought's encoded assumptions and dependencies. If misalignments are detected, the system can automatically generate bridging thoughts that reconcile differences between the cached reasoning and the current context. For example, if a cached mathematical proof assumes certain preconditions that differ slightly from the current problem, the system generates additional reasoning steps to account for these differences.

The system's thought schema includes explicit version controls and model compatibility markers. These markers identify which model versions and architectures have successfully utilized each thought, enabling the cache to predict compatibility issues before attempting thought reuse. When new model versions are deployed, the system can automatically flag thoughts that may require revalidation or adaptation to maintain compatibility with updated model capabilities or knowledge cutoffs.

Through these standardization and compatibility mechanisms, the thought cache ensures reliable thought transfer across different models and contexts while maintaining the integrity of reasoning patterns. The combination of structured thought representation, contextual validation, and adaptive transformation enables efficient thought reuse while preventing inconsistencies or misinterpretations.

Through this architecture, the system achieves effective unlimited context not through brute-force token retention but through intelligent abstraction and synthesis of understanding. The smaller language model can process these thought-based contexts more efficiently than traditional token sequences, enabling contextual reasoning without the computational overhead typically associated with extended context windows.

The system supports multiple architectural approaches for maintaining extended context through thought processing. While transformer-based attention mechanisms provide one implementation path, the system can alternatively employ recurrent neural networks (RNNs) for processing thought sequences. In an RNN-based implementation, thoughts are processed sequentially, with the network's hidden state maintaining a compressed representation of historical context. This approach enables efficient processing of arbitrary-length thought sequences while maintaining a constant memory footprint, as the hidden state size remains fixed regardless of sequence length.

The system may also implement memory networks for thought storage and retrieval. These networks maintain an explicit, addressable memory that stores thought representations and their relationships. Unlike attention mechanisms that must process all context simultaneously, memory networks can selectively access relevant thoughts through content-based addressing. The memory network architecture enables direct access to specific thoughts based on relevance to the current prompt, without requiring linear scanning of the entire context history.

The thought cache itself can be structured as a differentiable neural memory, where thoughts are stored as embeddings that can be smoothly updated and combined. This approach enables the cache to learn optimal thought storage and retrieval patterns through experience, adapting its organization to maximize the utility of cached thoughts. The differentiable memory structure supports gradient-based optimization of thought storage and retrieval operations, allowing the system to continuously improve its context management efficiency.

Hybrid architectures combining multiple approaches can leverage the strengths of each method. For example, in one embodiment, the system might employ RNNs for sequential thought processing while using a memory network for long-term storage, or combine transformer attention for recent context with compressed RNN states for historical context. These hybrid approaches enable flexible scaling of context processing based on specific application requirements and resource constraints.

Figure 4:
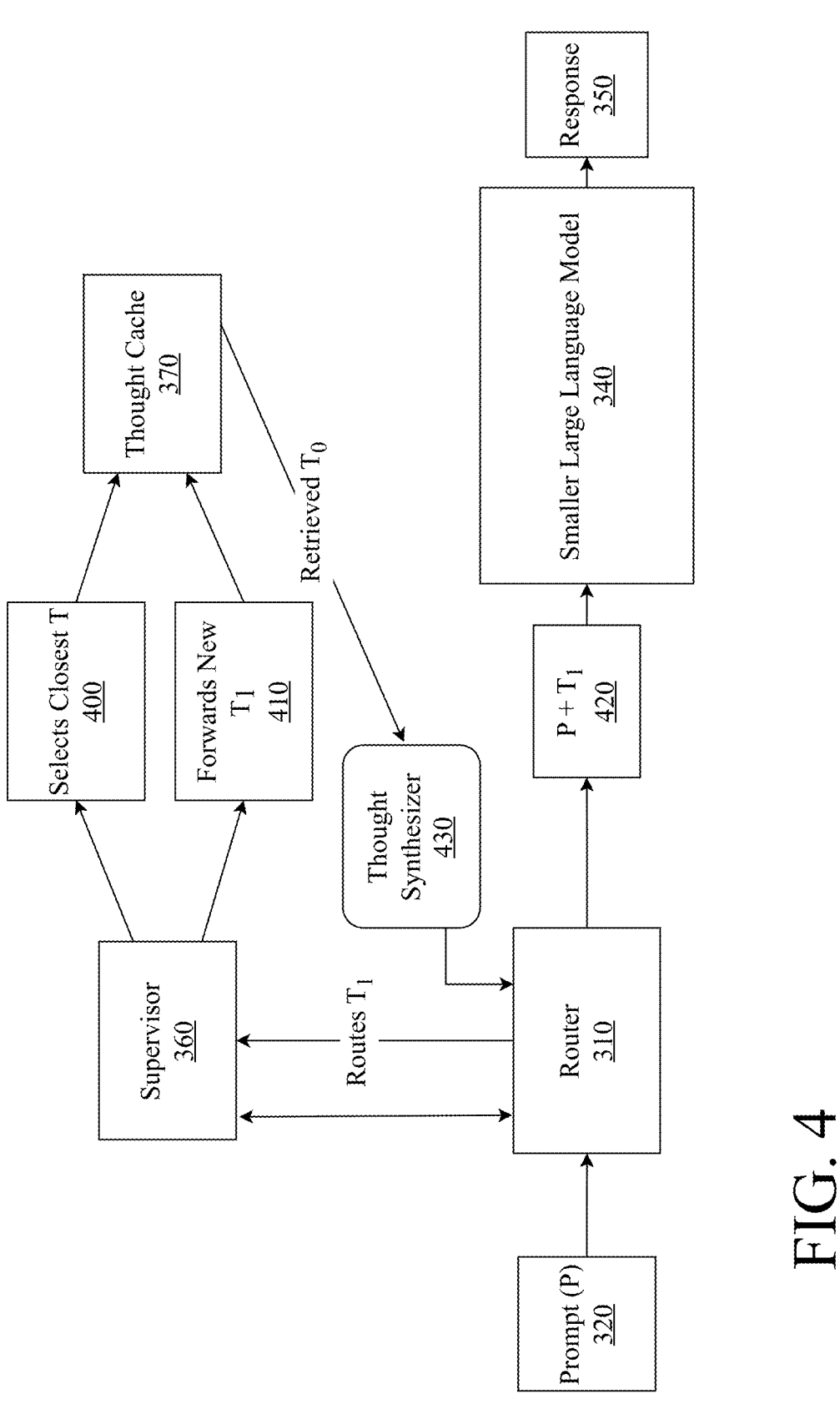
FIG. 4 is a block diagram illustrating an exemplary system architecture for a multi-state LLM with unlimited context with thought synthesis and retrieval.

FIG. 4 is a block diagram illustrating an exemplary system architecture for a multi-state LLM with unlimited context with thought synthesis and retrieval. The figure demonstrates how the system handles scenarios where cached thoughts may be relevant but not precisely matched to the current prompt.

The system begins when a prompt (P) 320 is received by the router 310. When router 310 receives a prompt 320, it interacts with the thought cache 370 through the controller 360 to retrieve potentially relevant thoughts.

The controller 360 performs two key functions in this embodiment. First, it selects the closest thought ($T_0$) 400 from the cache that relates to the current prompt. Second, after a synthesizer 430 creates a new thought $T_1$ 410, controller 360 manages the storage of newly synthesized thoughts. The controller evaluates the retrieved $T_0$ against certain relevance thresholds to determine if synthesis is needed. These thresholds can be configured based on vector similarity scores between the prompt and the cached thought, with different thresholds potentially being set for different domains or use cases. For example, a threshold of 0.8 (on a 0-1 scale) might indicate the thought is relevant enough to use directly, while scores between 0.5-0.8 might trigger synthesis with other related thoughts, and scores below 0.5 might indicate the need to generate entirely new thoughts using the large model. The system can also employ multiple thresholds simultaneously—one for determining if a thought is "close enough" to use directly, another for determining if thoughts are similar enough to be candidates for synthesis, and another for determining if cached thoughts are relevant enough to be considered at all.

The system can assign and append relevance scores and metadata to thoughts in several ways. When a thought (T) is created by the large model, it can be analyzed and scored across multiple dimensions including but not limited to quality assessment metrics, vector embeddings, usage statistics, and domain tags. Quality assessment encompasses the thought's reasoning pattern quality based on its structure and completeness, accuracy scores for verifiable facts, and confidence scores from the model about its conclusions. Vector embeddings can be calculated and stored with each thought, allowing for fast similarity comparisons during cache lookups, with multiple specialized embeddings potentially stored for different aspects like topic, reasoning style, and domain. Usage statistics track metrics such as success rates when the thought is used (including user feedback), frequency of successful reuse, and performance metrics when used with different types of prompts. Domain tags provide additional context through subject matter categorization, specific topic tags, and required expertise level indicators. These scores and metadata can be stored alongside the thought in the cache in a structured format and updated over time based on usage patterns. The comprehensive metadata enables more sophisticated routing and synthesis decisions while allowing the system to improve its thought selection over time through continuous feedback and performance tracking. For instance, a thought might store its general and domain-specific embeddings, various quality and confidence scores, detailed categorization, and usage statistics, all of which can be used to make more informed decisions about when and how to use or synthesize that thought in future operations.

A synthesizer 360 processes $T_0$ to create a new thought $T_1$ that better aligns with the current prompt's requirements. For example, if a prompt asks about specific aspects of quantum computing, and $T_0$ contains general quantum computing concepts, the synthesizer can create a $T_1$ that focuses more precisely on the specific aspects requested in the prompt.

Thought synthesizer 430 combines and processes thoughts when multiple relevant thoughts are found or when existing thoughts need modification. For example, if one cached thought covers quantum bits and another covers error correction, the synthesizer can combine these into a new thought that addresses quantum computing error rates in qubits. The synthesizer can also adapt existing thoughts to better match current prompt requirements. This synthesis process involves understanding the logical relationships between different thoughts, identifying complementary and conflicting information, and creating coherent combinations that preserve the accuracy and context of the original thoughts. The synthesizer employs various combination strategies depending on the relationship between thoughts—it might perform simple concatenation for complementary thoughts, create hierarchical structures for nested concepts, or generate entirely new bridging content to connect related ideas. Additionally, the synthesizer can evaluate the quality of synthesized thoughts and may generate multiple candidate combinations before selecting the most appropriate one based on relevance scores and coherence metrics.

The synthesizer can work with multiple retrieved thoughts simultaneously, combining relevant aspects from each to create a more comprehensive $T_1$. For instance, if one cached thought contains information about neural networks and another about computer vision, the synthesizer could combine relevant aspects of both to create a new thought more specifically targeted to a prompt about neural networks in computer vision applications.

The system may implement multiple strategies for thought synthesis, enabling the combination of existing cached thoughts to generate new, contextually relevant thoughts without necessarily engaging the large language model. These synthesis mechanisms operate on both the semantic content and vector representations of thoughts, employing various combination strategies depending on the relationship between thoughts and specific prompt requirements. The fundamental approach builds upon vector-based synthesis, where thoughts are represented in a high-dimensional embedding space that preserves semantic relationships through spatial relationships. In one embodiment, when multiple relevant thoughts are retrieved from the cache, their vector representations can be combined through a plurality of mathematical operations to create new thought vectors. These operations may include but are not limited to weighted averaging where more relevant thoughts receive higher weights in the final combination, vector addition with normalization that preserves the directional information of component thoughts, dimensional projection where thoughts are combined along specific semantic dimensions while preserving others, and non-linear combination using learned transformation matrices.

The system demonstrates this vector-based synthesis through concrete applications. For instance, when processing a prompt that requires information about quantum computing's impact on cryptocurrency, and the cache contains separate thoughts about quantum computing $(T_1)$ and cryptocurrency security $(T_2)$, the system performs a weighted combination expressed as $T\_new=\alpha*T1+\beta*T2$, where $\alpha$ and $\beta$ represent relevance weights determined by similarity scores between each thought and the prompt. The resulting vector $T\_new$ is normalized to maintain consistent magnitude in the embedding space, ensuring that the synthesized thought retains proper proportional representation of its component concepts.

Beyond pure vector operations, the system, in additional embodiments, may employ neural synthesis through a specialized small-scale transformer model trained specifically for thought combination. A neural synthesizer would receive multiple thought vectors as input and generates a new, synthesized thought that captures the relevant aspects of all inputs while maintaining internal consistency. The neural synthesis component is capable of identifying and resolving contradictions between input thoughts, preserving temporal relationships and causal chains, generating bridging content to connect related concepts, and maintaining consistency with the original prompt context. This approach proves particularly valuable when combining thoughts that require subtle understanding of context and implications.

In another embodiment, the system may implement rule-based synthesis through a set of predefined combination patterns based on the logical relationship between thoughts. These patterns support sequential combination for thoughts representing steps in a process, hierarchical combination for thoughts with parent-child relationships, comparative combination for contrasting or parallel thoughts, and supplementary combination for thoughts that provide additional context or examples. The rule-based approach ensures that the structural integrity of thought relationships is preserved during synthesis.

In an embodiment, the system may employ a synthesis quality assessor that evaluates potential thought combinations before they are executed. This assessment examines semantic coherence of the combined thought, preservation of critical information from source thoughts, relevance to the original prompt, and internal consistency of the synthesized thought. The quality assessment process helps prevent the generation and propagation of invalid or inconsistent thought combinations.

In scenarios where multiple synthesis strategies might apply, the system employs a multi-stage synthesis process. This process begins by generating candidate syntheses using different strategies, proceeds to evaluate each candidate using quality metrics, selects the highest-quality synthesis result, and caches the successful synthesis strategy for similar future combinations. This approach ensures optimal synthesis results while building a knowledge base of effective strategies.

The synthesis mechanism supports multiple operation modes including synchronous operation for immediate response requirements, asynchronous operation for background synthesis and cache optimization, and hybrid operation for progressive refinement of synthesized thoughts. This flexibility allows the system to balance response time requirements with synthesis quality needs. Through these synthesis mechanisms, the system can effectively combine and evolve cached thoughts to address new prompts without always requiring the computational overhead of the large language model, while maintaining the quality and relevance of generated responses.

Once $T_1$ is created, it is combined with the original prompt to form P+$T_1$ 420, which is then processed by the smaller language model 340 to generate the final response 350. The newly synthesized $T_1$ is also routed back through the controller for potential caching with thought cache 370, allowing it to be used for future similar prompts.

In one embodiment, thought cache 370 provides performance improvements by eliminating redundant reasoning computations across similar prompts. When 310 router identifies a new prompt with reasoning requirements similar to previously processed queries, thought cache 370 can supply validated thought patterns rather than requiring the large language model to reconstruct the reasoning chain from scratch. This caching mechanism is particularly effective for common analytical patterns, such as mathematical derivations, logical deductions, or standard analytical frameworks that appear frequently across different prompts.

Additionally, thought cache 370 is capable of serving as a quality assurance mechanism by maintaining verified reasoning patterns. Once a thought sequence has been validated and demonstrates consistent success in generating accurate responses, that sequence becomes a trusted template for handling similar queries. For instance, when processing mathematical problems, the cache may contain verified proof structures that can be applied to new problems within the same class, ensuring consistent and reliable solution approaches.

In one embodiment, thought cache 370 implements a validation scoring system that tracks the success rate and reliability of each cached thought. This scoring considers factors such as but not limited to response accuracy, user feedback, and consistency with known truth standards. Thoughts that consistently contribute to high-quality responses receive higher validation scores, making them more likely to be selected for reuse in similar contexts. The cache can also mark certain thoughts as "golden" references when they demonstrate exceptional reliability in specific domains, establishing them as preferred reasoning patterns for their respective problem types.

To prevent the propagation of incorrect reasoning, thought cache 370 may employ a continuous validation mechanism. This mechanism monitors the performance of cached thoughts and can automatically flag patterns that lead to inconsistent or incorrect responses. When potential issues are detected, thought cache 370 may temporarily suspend the use of problematic thoughts and route similar prompts through the large language model for fresh analysis. This self-correction capability ensures that the efficiency benefits of thought caching do not come at the expense of response quality.

Thought cache 370 is capable of supporting selective thought inheritance, where new prompts can partially inherit validated reasoning patterns while allowing for context-specific modifications. This flexibility enables the system to leverage proven reasoning frameworks while adapting them to specific query requirements, combining the benefits of cached reliability with contextual relevance. Through these mechanisms, the thought cache achieves both performance optimization and quality enhancement, delivering faster responses while maintaining or improving the reliability of the system's outputs.

Through this synthesis process, the system can effectively leverage partially relevant cached thoughts to create more precise and relevant thoughts for the current prompt, reducing the need to engage the large language model while still maintaining response quality and relevance.

In another embodiment, thought cache 370 implements security and privacy controls to protect sensitive information while enabling efficient thought reuse. At the storage level, thought cache 370 maintains isolation between user contexts through encrypted partitioning. Each user's thoughts are encrypted with user-specific keys, ensuring that even within shared cache infrastructure, thoughts remain securely compartmentalized. This encryption extends to both the thought content and the associated metadata, preventing unauthorized access to reasoning patterns that might reveal proprietary information.

In the embodiment, thought cache 370 implements a permissions framework that governs thought sharing and reuse. By default, thoughts derived from user interactions are marked private and restricted to the originating user's context. Users can optionally designate specific thoughts for shared use through explicit consent mechanisms. When thoughts are marked for sharing, the cache employs automated sanitization processes that strip personally identifiable information and sensitive data while preserving the underlying reasoning patterns. This sanitization uses advanced pattern recognition to identify and remove context-specific details while maintaining the thought's utility for general reasoning.

To protect against cache poisoning attacks, thought cache 370 may incorporate a multi-stage validation pipeline. Before any thought is cached, it undergoes verification through a separate validation model that assesses its logical consistency and checks for potential malicious patterns. The cache maintains cryptographic checksums of validated thoughts, enabling rapid verification of thought integrity during retrieval operations. Additionally, the cache tracks the provenance of each thought, maintaining secure audit trails of thought creation, modification, and usage patterns.

The system implements graduated access controls that can restrict thought reuse based on security clearance levels, organizational boundaries, or specific sharing agreements. These controls allow enterprises to maintain separate thought caches for different security domains while selectively enabling thought sharing under controlled conditions. For instance, a financial institution might maintain separate caches for public customer service interactions and privileged internal analyses, with strict controls governing any cross-domain thought utilization.

Through these security mechanisms, the thought cache enables efficient reasoning reuse while protecting sensitive information and maintaining system integrity. The combination of encryption, access controls, and validation processes ensures that the performance benefits of thought caching do not compromise security or privacy requirements.

Figure 5:
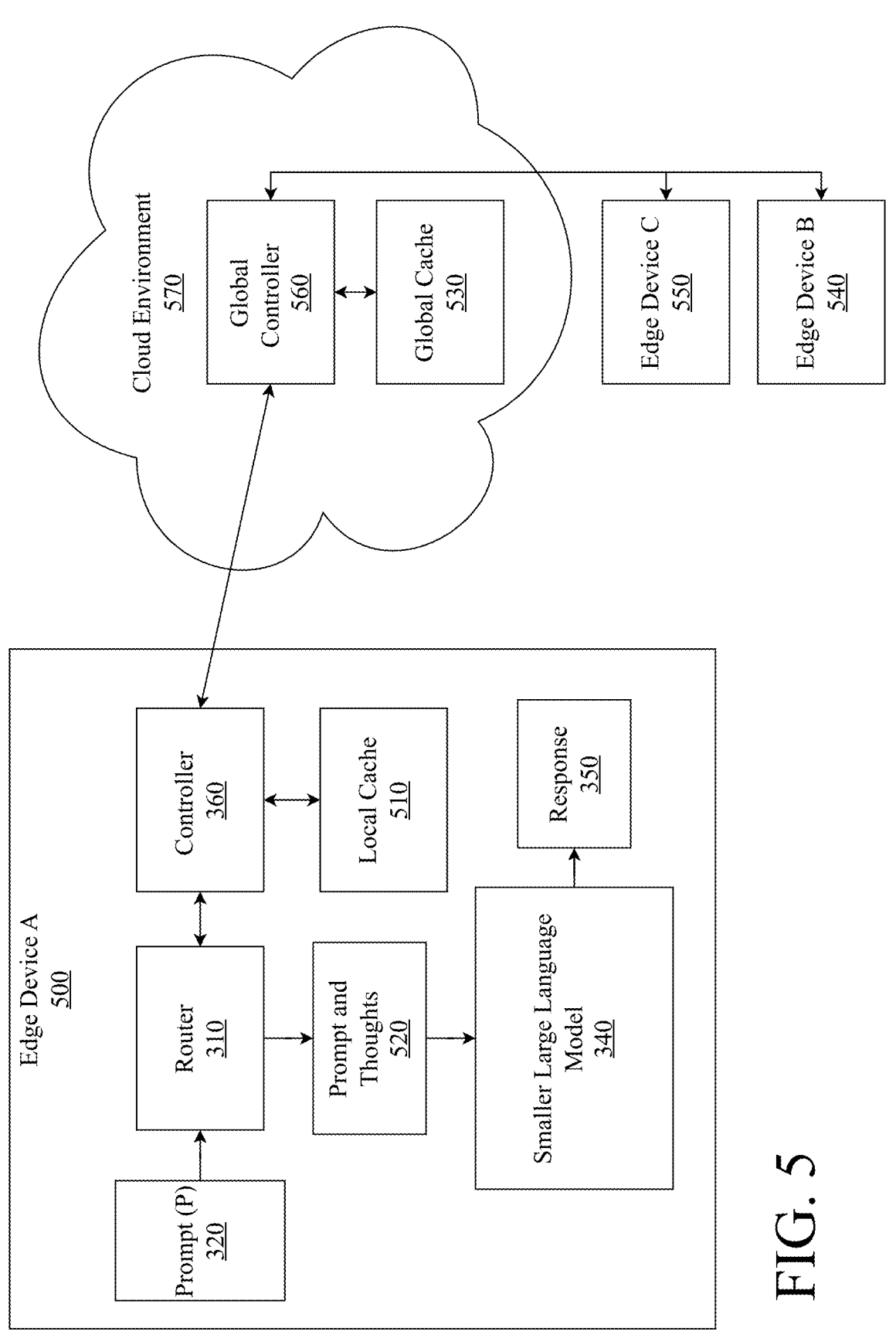
FIG. 5 is a block diagram illustrating an exemplary system architecture for a multi-state LLM with unlimited context with local and global thought caches.

FIG. 5 is a block diagram illustrating an exemplary system architecture for a multi-state LLM with unlimited context with local and global thought caches. This embodiment demonstrates how the system can operate primarily on edge devices while maintaining access to a broader knowledge base through cloud connectivity.

Edge device A 500 represents a complete edge implementation of the system, which could be a device such as but not limited to a mobile phone, tablet, or other personal computing device. Within the edge device 500, router 310 receives prompts (P) 320 and coordinates with a local controller 360 and local cache 510. Local cache 510 stores frequently accessed or personally relevant thoughts directly on the device, enabling quick access and offline functionality.

The smaller language model 340 runs directly on the edge device, processing prompt and thought combinations 520 to generate responses 350. This local processing capability significantly reduces latency and computational requirements compared to constantly accessing cloud resources.

The cloud environment 570 contains a global cache 530 managed by a global controller 560. This global infrastructure serves as a centralized repository for thoughts generated across multiple edge devices (B 540, C 550). The global controller coordinates cache synchronization and manages access patterns across the network of connected devices.

When an edge device's controller 360 cannot find relevant thoughts in its local cache 510, it can query the global controller 560 to search the global cache 530. For example, if a user on edge device A 500 asks a question about a topic they haven't encountered before, the system first checks the local cache 510, then can reach out to the global cache 530 for relevant thoughts.

The system supports bi-directional synchronization, where new thoughts generated on edge devices can be uploaded to the global cache, and frequently accessed global thoughts can be downloaded to local caches. This creates a dynamic knowledge-sharing environment while maintaining efficient local operation.

Through this architecture, the system provides the benefits of edge computing (low latency, offline capability, privacy) while maintaining access to a broader knowledge base through the cloud infrastructure. The distributed nature of the system allows for efficient scaling and knowledge sharing across user communities while minimizing the computational load on individual devices.

FIG. 6 is a block diagram illustrating exemplary components for a multi-state LLM with unlimited context, a router and a controller. A prompt analyzer 600 processes incoming prompts to determine their characteristics, domain, and requirements. For example, if a user submits a prompt about quantum computing, the analyzer identifies key technical terms, determines the complexity level, and flags specific concepts that may need specialized thoughts. It also evaluates whether the prompt requires reasoning about multiple concepts (like quantum computing and machine learning) that might benefit from thought synthesis. Analyzer 600 employs natural language processing to break down the prompt into component parts, identifying primary topics, subtopics, relationships between concepts, required depth of knowledge, and any constraints or special requirements specified in the prompt. It can also detect the tone and style of the desired response, technical sophistication level of the user, and whether the prompt requires factual recall, analytical reasoning, or creative synthesis.

A cache query interface 610 serves as the communication bridge between the router and cache systems. It formats prompt analysis results into efficient cache queries and manages the retrieval process. For instance, when searching for thoughts about quantum computing, it might query both technical definition thoughts and practical application thoughts, managing multiple parallel cache requests to both local and global caches. The interface optimizes query patterns based on the analyzer's output, constructing sophisticated search parameters that account for concept hierarchies, semantic relationships, and contextual relevance. It can prioritize different aspects of the query based on importance, manage query timeouts and fallbacks, and handle distributed cache architectures efficiently. The interface also implements caching strategies to optimize frequent queries and manages cache coherence between local and global storage.

A model selector 620 makes intelligent decisions about model utilization based on cache results and prompt analysis. It implements decision logic to determine whether to: use the large model for new thought generation, proceed with cached thoughts through the smaller model, or employ a hybrid approach. For example, if highly relevant thoughts exist in the cache, it might bypass the large model entirely to save computational resources. In one embodiment, model selector 620 employs decision trees and heuristics that consider multiple factors including thought relevance scores, computational resource availability, response time requirements, and quality thresholds. It can dynamically adjust its selection criteria based on system load, cache hit rates, and historical performance metrics. Model selector 620 also maintains statistics about the effectiveness of its decisions to continuously refine its selection strategy and may implement different selection policies based on user preferences or application requirements.

A cache manager 630 handles the organization, storage, and retrieval of thoughts in both local and global caches. It implements indexing strategies for quick thought retrieval and manages cache memory efficiently. For example, it might maintain separate indices for different knowledge domains or implement priority-based storage systems where frequently accessed thoughts are kept in faster memory. Cache manager 630 implements eviction policies to optimize cache utilization, considering factors such as but not limited to thought frequency of use, recency, size, and interdependencies with other cached thoughts. It also handles cache coherence between local and global stores, implements versioning and conflict resolution for distributed caches, and maintains metadata about cache performance and utilization patterns. The manager can dynamically adjust its caching strategies based on usage patterns and system resources, potentially implementing different policies for different types of thoughts or knowledge domains.

A thought selector 640 implements algorithms to identify and select the most relevant thoughts from the cache. It uses similarity metrics and relevance scoring to rank cached thoughts based on their applicability to the current prompt.

For instance, when processing a prompt about quantum computing applications in cryptography, it might prioritize thoughts that bridge both quantum and cryptographic concepts. Thought selector 640 may employ multiple ranking algorithms that consider various aspects of thought relevance, including semantic similarity, contextual appropriateness, freshness, and historical success rates. It can perform multi-stage selection processes, first identifying broadly relevant thoughts and then refining the selection based on more specific criteria. The selector also considers relationships between thoughts, potentially selecting groups of related thoughts that together provide comprehensive coverage of the prompt's requirements. It maintains performance metrics about selection accuracy and can adapt its selection criteria based on feedback about the effectiveness of selected thoughts in generating successful responses.

A sync controller 650 manages the complex task of synchronizing thoughts between local and global caches. It implements policies for when to upload local thoughts to the global cache and when to download global thoughts to local storage. For example, it might upload locally generated thoughts about emerging technologies to the global cache while downloading commonly accessed thoughts about fundamental concepts to local storage. Sync controller 650 may employ synchronization strategies that balance network bandwidth usage, storage constraints, and data freshness requirements. It implements conflict resolution mechanisms for handling simultaneous updates, version control for tracking thought evolution, and differential synchronization to minimize data transfer. Sync controller 650 can adapt its sync frequency and policies based on usage patterns, network conditions, and device capabilities. It also maintains detailed synchronization logs and metrics to optimize future sync operations and implements recovery mechanisms for handling failed synchronization attempts. Additionally, sync controller 650 can prioritize synchronization tasks based on thought importance, urgency, and resource availability.

A quality assessor 660 continuously evaluates thought quality and usefulness. It monitors factors such as thought relevance, accuracy, and usage patterns to maintain cache quality. For example, if certain thoughts consistently lead to high-quality responses (as measured by user feedback or other metrics), they might be prioritized for retention and synchronization. Conversely, thoughts that rarely prove useful might be flagged for removal or update. Quality assessor 660 may employ multiple evaluation criteria including syntactic correctness, semantic coherence, factual accuracy, and practical utility. It maintains historical performance metrics for each thought, tracking success rates in different contexts and user satisfaction levels. Quality assessor 660 can detect outdated or inconsistent thoughts, identify redundant thoughts that could be merged, and flag thoughts that may need revision due to changing knowledge or requirements. It implements adaptive quality thresholds that can vary based on thought domain, importance, and usage context. Quality assessor 660 also provides detailed quality reports that can be used to guide cache maintenance operations and thought synthesis decisions, and it can trigger automatic thought improvement processes when quality metrics fall below acceptable thresholds.

Description of Method Aspects

FIG. 7 is a flow diagram illustrating an exemplary method for natural language processing using a dual-model approach with thought generation. In a first step 700, the system receives a prompt from a user. This prompt can be any form of natural language input, such as a question, command, or statement. For example, a user might input "Explain how quantum entanglement works and its applications in quantum computing."

In a step 710, the system processes the prompt through a first large language model. This model is the larger of the two models, containing more parameters and greater processing capability. During this step, the prompt is encoded and processed through the model's architecture to begin the reasoning process. Continuing the example, the large model begins analyzing the quantum entanglement prompt to understand its complexity and required knowledge domains.

In a step 720, the first large language model converts the prompt into thoughts. These thoughts represent the model's reasoning process and understanding of the prompt's requirements. For the quantum entanglement example, the model might generate thoughts such as: "Quantum entanglement involves pairs of particles maintaining correlated properties regardless of distance" and "In quantum computing, entanglement enables quantum bits to exist in multiple states simultaneously, increasing computational power."

In a step 730, the system routes both the original prompt and the generated thoughts to a second large language model that has fewer parameters than the first model. This routing process combines the original prompt and the generated thoughts into a structured input format that the smaller model can efficiently process. Using the example, both the quantum entanglement prompt and the theoretical thoughts about quantum mechanics are packaged together and sent to the smaller model.

In a step 740, the system generates a response using the second large language model, utilizing both the original prompt and the thoughts generated by the first model. This smaller model, while having fewer parameters, can generate high-quality responses because it has access to the sophisticated reasoning already performed by the larger model. In the quantum entanglement example, the smaller model can now generate a clear, accurate response by leveraging both the original prompt and the theoretical framework provided by the larger model's thoughts, without needing to independently reason about complex quantum mechanics concepts.

This method enables efficient use of computational resources while maintaining response quality by leveraging the strengths of both models: the sophisticated reasoning capabilities of the larger model and the efficient response generation of the smaller model.

FIG. 8 is a flow diagram illustrating an exemplary method for thought creation, evaluation, and storage within the system. In a first step 800, the system receives a prompt from a user. This prompt represents any natural language input that requires processing. For example, a user might input "What are the implications of quantum computing on modern cryptography?"

In a step 810, the prompt analyzer processes the input to determine key concepts and requirements. During this step, the analyzer identifies main topics, subtopics, and relationships between concepts. In our example, the analyzer would identify key concepts such as "quantum computing," "cryptography," and their intersection, while also determining the need for forward-looking analysis given the word "implications."

In a step 820, the system queries the thought cache to determine if similar thoughts exist. The query process involves searching both local and potentially global caches for thoughts that match the analyzed concepts. For the example, the system might search for existing thoughts about quantum computing's effects on encryption methods, post-quantum cryptography, or quantum-safe algorithms.

In a step 830, if no similar thoughts exist or existing thoughts aren't sufficiently relevant, the system generates new thoughts using a thought synthesizer. This component may combine fragments of related thoughts or generate entirely new ones. Following the example, if thoughts about quantum computing and modern cryptography exist separately, the synthesizer might combine and adapt them to address their intersection specifically.

In a step 840, the quality assessor evaluates the newly synthesized thoughts. This evaluation considers factors such as relevance, coherence, and completeness. For instance, it would assess whether the synthesized thoughts about quantum computing's cryptographic implications adequately cover both technical and practical aspects of the topic.

In a step 850, the system stores the new thoughts in the cache with appropriate metadata and indexing. This step includes tagging the thoughts with relevant keywords, creating appropriate vector embeddings for future similarity searches, and organizing them within the cache's structure. The thoughts about quantum cryptography might be indexed under both quantum computing and cryptography categories, with metadata indicating their relationship to security, encryption, and future technology implications. This method ensures that the system continuously builds and refines its knowledge base while maintaining quality and accessibility of stored thoughts.

FIG. 9 is a flow diagram illustrating an exemplary method for synchronizing thought caches between local devices and a global cloud environment. In a first step 900, the system initializes a connection between a local device and the cloud environment. This step establishes secure communication channels and verifies authentication credentials. For example, when a user's mobile device connects to the cloud service, it establishes an encrypted connection and validates the device's identity and permissions.

In a step 910, the system identifies new or modified thoughts in the local cache since the last synchronization event. This involves comparing timestamp metadata and modification flags of local thoughts with the last known sync state. For instance, if a user has generated new thoughts about quantum computing on their device while offline, these would be flagged for potential synchronization.

In a step 920, the system evaluates the quality and relevance of local thoughts for global storage. This evaluation considers factors such as thought complexity, uniqueness, and potential value to other users. For example, if a local device has generated highly specialized thoughts about quantum cryptography, the system assesses whether these thoughts would be valuable additions to the global knowledge base.

In a step 930, the system uploads selected local thoughts to the global cache through the sync controller. This step includes formatting the thoughts for global storage and managing the upload process. Continuing the example, the quantum cryptography thoughts would be packaged with appropriate metadata and transferred to the global cache.

In a step 940, the system queries the global cache for new relevant thoughts based on the device profile and usage patterns. This involves analyzing the user's interests and recent activities to identify potentially useful thoughts from the global cache. For instance, if the user frequently works with cryptography-related prompts, the system would search for recent additions to the global cache in this domain.

In a step 950, the system downloads selected global thoughts to the local cache based on relevance and storage capacity. This step optimizes local storage by prioritizing the most relevant thoughts while considering device limitations. For example, the system might download new thoughts about quantum encryption while removing older, less relevant thoughts to maintain optimal cache size.

In a step 960, the system updates synchronization metadata and timestamps for the next sync cycle. This includes recording which thoughts were synchronized, updating version information, and setting markers for the next synchronization event. This information ensures future sync cycles can efficiently identify new changes and maintain cache consistency. This method enables efficient knowledge sharing across a network of devices while maintaining both local and global thought repositories, effectively creating a distributed learning system that benefits from collective user interactions.

Figure 10:
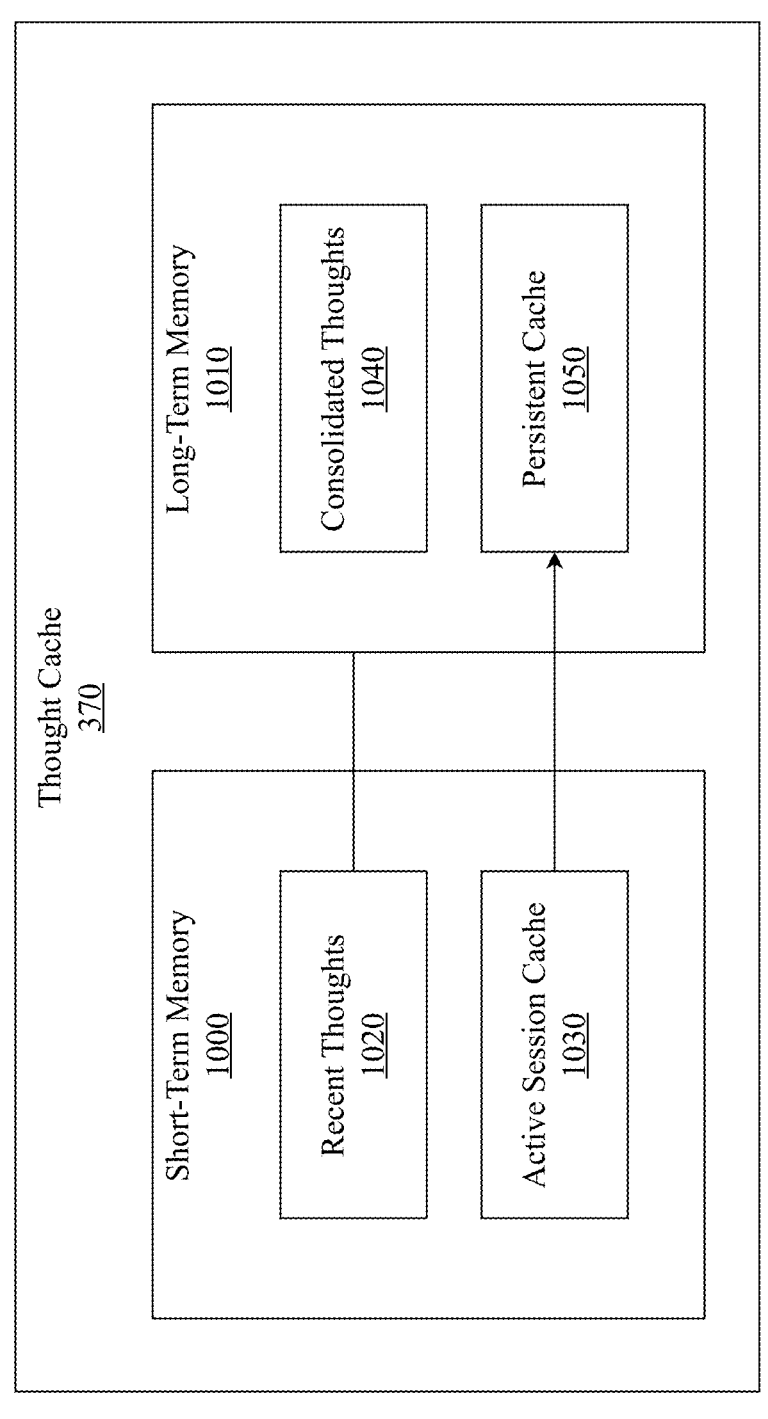
FIG. 10 is a flow diagram illustrating an exemplary system architecture of a thought cache that has both a long-term memory and a short-term memory.

FIG. 10 is a block diagram illustrating an exemplary system architecture of a thought cache that has both a long-term memory and a short-term memory. In one embodiment, thought cache 370 represents a system for maintaining effectively unlimited context in language models through progressive compression and intelligent caching of thought patterns, enabling shared reasoning across multiple AI instances.

Thought cache 370 implements both a short-term memory 1000 and a long-term memory 1010. This dual-memory architecture enables the system to maintain both immediate computational context and historical reasoning patterns while managing computational resources efficiently.

The short-term memory 1000 comprises recent thoughts 1020 and an active session cache 1030. Recent thoughts 1020 maintain complete thought fidelity, storing both the explicit reasoning chains and the internal model states that generated them. This storage preserves not only the textual representation of thoughts but also the computational context and attention patterns that produced them, enabling precise replication of reasoning processes. The active session cache 1030 provides rapid access to these thoughts and their associated states, optimizing performance for ongoing interactions and enabling immediate thought sharing between different AI instances or specialized reasoning modules operating within the same session.

The long-term memory 1010 implements a more sophisticated storage approach through consolidated thoughts 1040 and a persistent cache 1050. Consolidated thoughts 1040 represent progressively compressed versions of thought patterns, where multiple related thoughts are combined into more compact representations while preserving essential reasoning patterns. This consolidation process employs various compression techniques, including attention-based compression, semantic clustering, and state space reduction. The persistent cache 1050 implements an indexed storage system that enables semantic search and retrieval of these consolidated thoughts, supporting efficient thought sharing across different AI instances and computing sessions.

The system implements bidirectional information flow between these components. Thoughts can move from recent thoughts 1020 to consolidated thoughts 1040 through progressive compression, while the active session cache 1030 can transfer frequently accessed patterns to the persistent cache 1050 for long-term retention. This bidirectional flow enables dynamic thought sharing between different system components and AI instances, supporting collaborative reasoning across multiple agents.

The architecture supports multiple implementation approaches for thought storage and transfer. Thoughts can be stored as chain-of-thought text, internal model states, attention patterns, or hybrid representations combining multiple formats. The system can dynamically select the most appropriate storage format based on the thought's intended use and the capabilities of the AI instances that may access it.

This architectural design enables the thought cache to serve as a central memory system for multiple AI instances, supporting collaborative reasoning while maintaining computational efficiency. The combination of short-term and long-term memory systems, along with progressive compression and flexible thought representation, allows the system to maintain effectively unlimited context while enabling efficient thought sharing across different AI agents and reasoning modules.

Through this architecture, the system achieves both unbounded context maintenance and efficient cross-instance thought sharing, two key innovations that enable more sophisticated and resource-efficient AI reasoning systems. The design's flexibility in implementation approaches and storage formats helps prevent trivial circumvention while enabling broad application across different types of language models and AI systems.

In one embodiment the system implements a collaborative thought sharing architecture that enables multiple AI agents to access and utilize a common thought cache. This shared cache architecture supports distributed reasoning across different types of language models and specialized reasoning modules while maintaining thought consistency and accessibility. When multiple users or AI agents operate within the system, they can all contribute to and benefit from the accumulated reasoning patterns stored in the shared cache.

The shared thought cache maintains a unified index that enables any authorized user or AI agent to access relevant thoughts regardless of which agent originally generated them. This indexing system tracks not only the content of thoughts but also their originating context, generating agent, and successful usage patterns. For example, when a specialized mathematical reasoning module generates a thought containing a proof strategy, that thought becomes available to general language models handling related mathematical queries, enabling them to leverage expert reasoning patterns without duplicating the computational effort.

Thought transfer between specialized reasoning modules occurs through a standardized thought protocol. This protocol defines how thoughts are packaged, transmitted, and unpacked between different types of AI agents. When transferring thoughts, the system includes not just the reasoning content but also relevant metadata such as the thought's context requirements, assumptions, and compatibility markers. For instance, if a natural language processing agent generates insights about sentence structure, these thoughts can be transferred to a grammar checking module in a format that preserves the structural analysis while adapting it to the specialized module's processing requirements.

The system coordinates collaborative reasoning through a central orchestration mechanism. This orchestrator tracks which agents are actively processing related prompts and manages the flow of thoughts between them. When multiple agents encounter similar reasoning requirements, the orchestrator can initiate thought sharing to prevent redundant computation. For example, if one agent has already performed detailed analysis of a complex concept, other agents can build upon that analysis rather than repeating it.

Cross-instance reasoning is enabled through thought synthesis capabilities. When different model instances approach similar problems from different angles, their thoughts can be combined to create more comprehensive understanding. The system tracks the complementary strengths of different model instances and can route thoughts to the most appropriate agent for specific types of reasoning tasks. For instance, a general language model might handle initial prompt analysis, while specialized agents process domain-specific aspects, with their combined thoughts contributing to the final response.

The shared cache implements sophisticated access control and version management to maintain thought integrity across multiple agents. Each thought is versioned to track its evolution as different agents interact with and build upon it. The system maintains provenance information that records how thoughts are transformed and combined through multi-agent collaboration, enabling attribution and quality assessment of collaborative reasoning patterns.

Through these mechanisms, the system enables efficient distribution of reasoning tasks across specialized modules while maintaining coherent thought flow. The collaborative architecture allows different AI agents to contribute their specialized capabilities while benefiting from the collective reasoning capacity of the system. This approach significantly reduces computational redundancy while enabling more sophisticated reasoning through the combination of multiple specialized perspectives.

Mobile Device Optimized Multi-Stage LLM System Architecture

Figure 11:
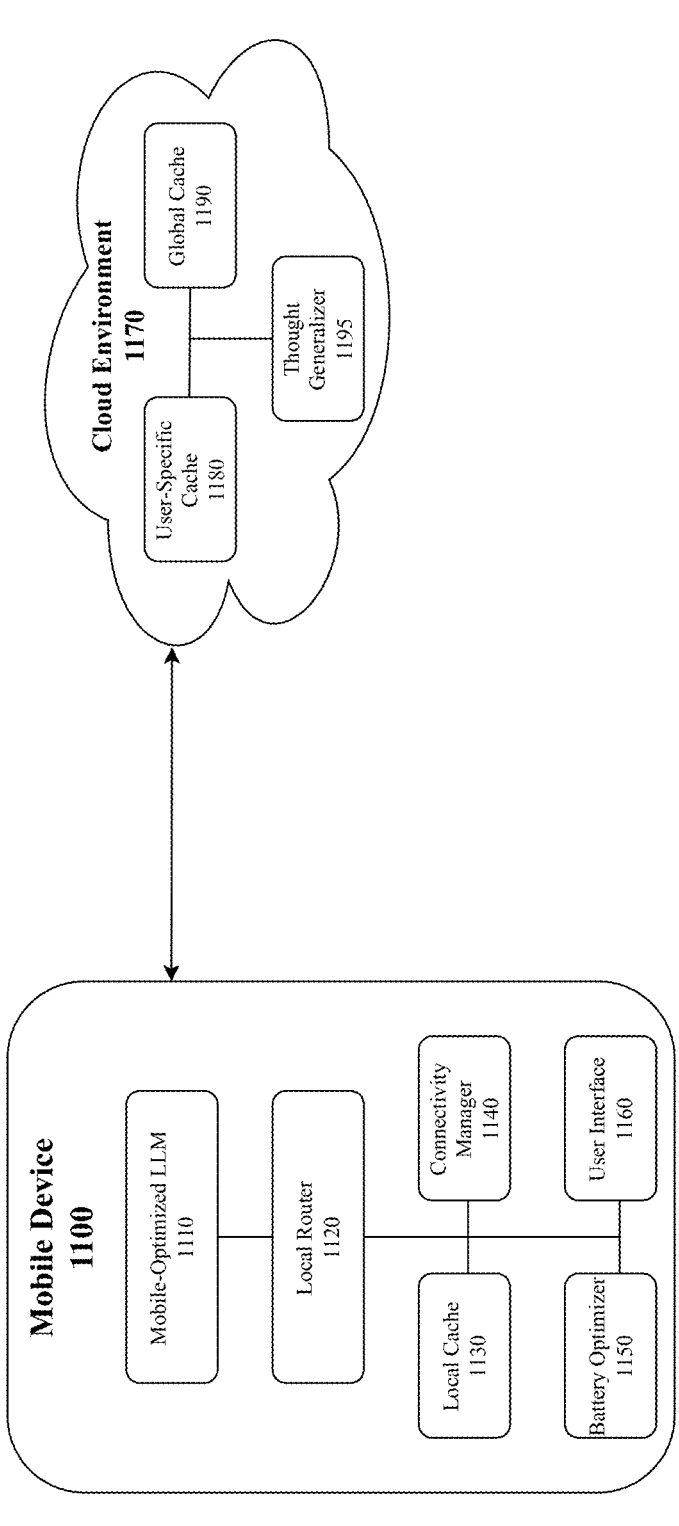
FIG. 11 is a block diagram illustrating exemplary architecture of mobile device optimized multi-stage LLM.

FIG. 11 is a block diagram illustrating exemplary architecture of mobile device optimized multi-stage LLM, in an embodiment. System 1100 operates primarily on mobile computing devices such as, but not limited to, smartphones, tablets, or wearable devices, with cloud connectivity for expanded capabilities.

Mobile device portion of system 1100 comprises several interconnected subsystems that enable efficient natural language processing while addressing mobile-specific constraints. Mobile-optimized LLM 1110 serves as primary processing engine for generating thoughts from user prompts. Unlike traditional large language models, mobile-optimized LLM 1110 employs architectural optimizations specific to mobile execution environments, including model quantization, attention mechanism optimizations, and memory-efficient transformer implementations. Mobile-optimized LLM 1110 processes user prompts to generate intermediate reasoning steps referred to as thoughts, which represent model's analysis and understanding of prompt requirements.

Local router 1120 functions as central coordination mechanism, determining processing paths for user prompts and managing data flow between system components. When user prompt is received, local router 1120 analyzes prompt characteristics and determines whether to process prompt through mobile-optimized LLM 1110 or attempt to retrieve relevant thoughts from local cache 1130. Local router 1120 implements decision logic based on prompt similarity to previously processed queries, availability of cached thoughts, current device resource state, and connectivity status.

Local cache 1130 stores both user-specific thoughts and frequently accessed generalized thoughts directly on mobile device. Local cache 1130 implements efficient storage and retrieval mechanisms optimized for limited mobile storage capacity, including compression techniques and priority-based caching policies. Local cache 1130 maintains two primary sections: personal section for user-specific thoughts and generalized section for commonly used reasoning patterns. This two-section approach enables offline functionality while maintaining privacy boundaries between personal and shared knowledge.

Connectivity manager 1140 monitors network status and manages data synchronization between mobile device and cloud environment. When network connectivity is available, connectivity manager 1140 orchestrates bidirectional synchronization of thoughts between local cache 1130 and both user-specific cloud cache 1180 and global cache 1190. Connectivity manager 1140 implements intelligent synchronization policies, including prioritizing high-value thoughts for limited connectivity scenarios, scheduling bandwidth-intensive operations during optimal network conditions, and maintaining synchronization queues when connectivity is intermittent.

Battery optimizer 1150 monitors device power state and dynamically adjusts system behavior to maximize battery efficiency. Battery optimizer 1150 implements multiple execution profiles for mobile-optimized LLM 1110, ranging from high-performance operation when device is charging to minimal power consumption modes when battery level is critical. Battery optimizer 1150 also coordinates with connectivity manager 1140 to schedule energy-intensive operations such as thought synchronization during charging periods or when device is in idle state.

User interface 1160 provides interaction layer between user and system 1100, handling prompt input and response presentation. User interface 1160 may integrate with mobile device capabilities such as voice input, camera-based context sensing, and haptic feedback to enhance interaction experience. User interface 1160 also provides transparency indicators when system operates in offline mode, communicating confidence levels and limitations appropriately to users.

Cloud environment 1170 extends capabilities of system 1100 beyond constraints of mobile device, providing expanded storage capacity and computational resources for specific operations. User-specific cloud cache 1180 securely stores complete history of user thoughts with appropriate encryption and access controls. Unlike local cache 1130 which must prioritize storage of thoughts based on utility and recency, user-specific cloud cache 1180 maintains comprehensive record of user interactions and generated thoughts, enabling long-term context preservation without consuming mobile device storage resources. User-specific cloud cache 1180 encrypts all stored thoughts with user-specific keys to maintain privacy and prevent unauthorized access.

Global cache 1190 maintains repository of generalized thoughts applicable across multiple users. These thoughts represent common reasoning patterns and knowledge structures that have utility beyond individual user contexts. Global cache 1190 organizes thoughts into domain-specific clusters, reasoning frameworks, and abstracted templates to facilitate efficient retrieval based on prompt characteristics. Unlike user-specific cloud cache 1180, global cache 1190 contains no personally identifiable information or user-specific context.

Thought generalizer 1195 processes user-generated thoughts to create anonymized, generalized thought patterns for global cache 1190. Thought generalizer 1195 implements multi-stage pipeline including pattern recognition to identify similar reasoning approaches across users, context removal techniques that strip away user-specific elements, and abstraction methods that transform specific thoughts into more universally applicable structures. Thought generalizer 1195 operates exclusively in cloud environment 1170 to leverage increased computational resources and access to thoughts across multiple users.

In operation, when user submits prompt through user interface 1160, local router 1120 first queries local cache 1130 to determine if relevant thoughts exist. If suitable thoughts are found, they are combined with original prompt and processed by smaller language model (not shown in FIG. 11, see for example FIG. 5) to generate response. If no relevant thoughts exist in local cache 1130, local router 1120 checks connectivity status through connectivity manager 1140. If online, system may query user-specific cloud cache 1180 and global cache 1190 for relevant thoughts. If offline or if no relevant thoughts are found in cloud caches, prompt is processed by mobile-optimized LLM 1110 to generate new thoughts. These new thoughts are then processed alongside original prompt by smaller language model to generate response.

Throughout this process, battery optimizer 1150 continuously monitors power state and adjusts system behavior accordingly. When device is charging or has sufficient battery capacity, system may utilize more complex model configurations or perform background synchronization operations. When battery level is low, system prioritizes efficiency over comprehensive processing, potentially utilizing more cached thoughts or simplified model configurations.

New thoughts generated during operation are cached in local cache 1130 and, when connectivity permits, synchronized with user-specific cloud cache 1180 through connectivity manager 1140. Connectivity manager 1140 implements priority-based synchronization, ensuring most valuable thoughts are transferred first during limited connectivity periods. Thought generalizer 1195 periodically analyzes thoughts across multiple users to identify patterns suitable for generalization, with resulting abstracted thoughts stored in global cache 1190 for broader reuse across system.

Figure 12:
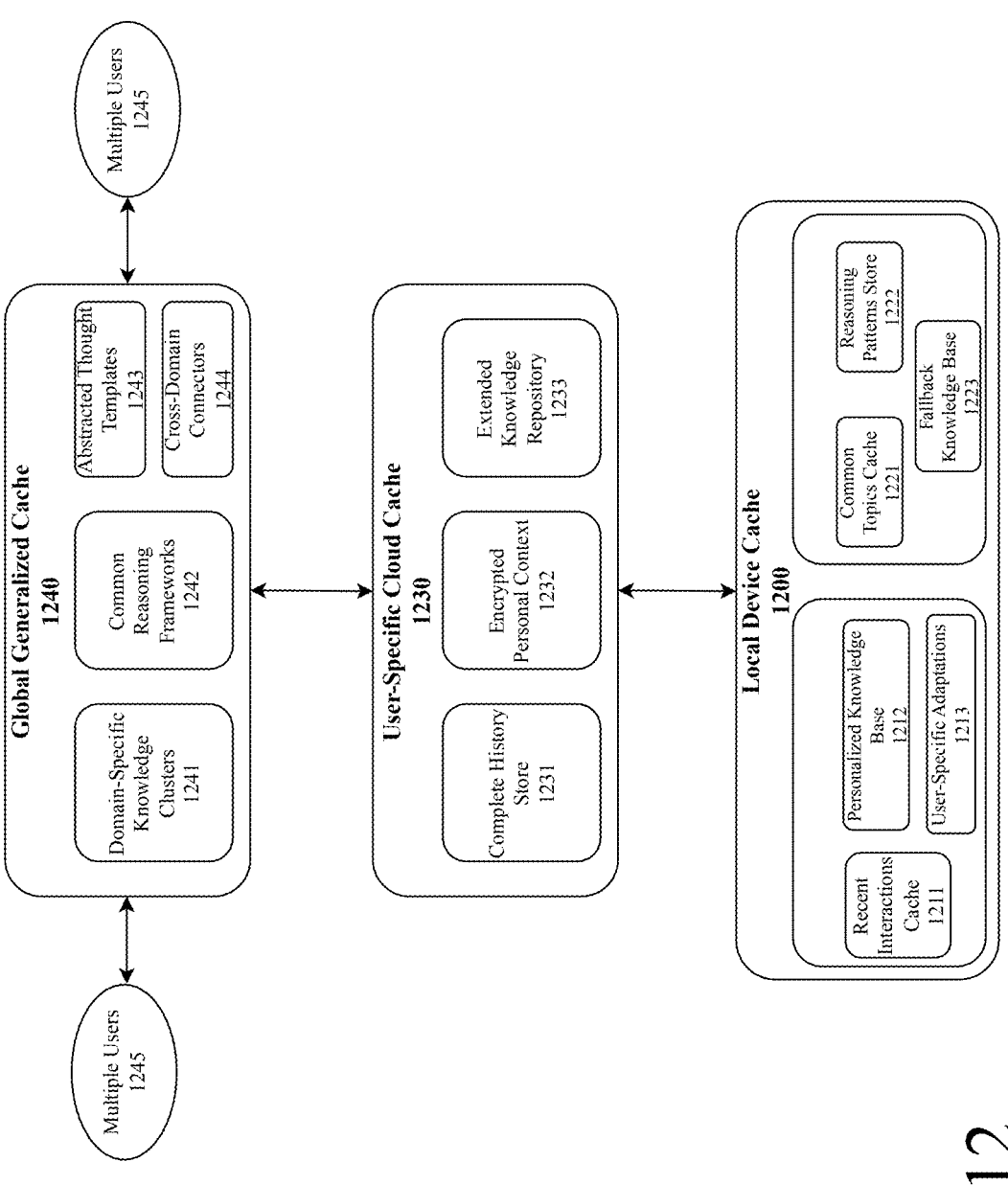
FIG. 12 is a block diagram illustrating exemplary architecture of three-tier thought caching architecture.

FIG. 12 is a block diagram illustrating exemplary architecture of three-tier thought caching architecture, in an embodiment. Three-tier thought caching architecture 1200 implements hierarchical approach to thought storage that balances privacy, efficiency, and knowledge sharing while accommodating constraints of mobile computing environments.

At device level, local device cache 1200 serves as primary storage mechanism for thoughts directly accessible on mobile device without requiring network connectivity. Local device cache 1200 comprises two main sections optimized for different types of thought storage. Personal section 1210 maintains user-specific thoughts and personalized knowledge patterns. Within personal section 1210, recent interactions cache 1211 stores thoughts generated during latest user sessions with full fidelity and minimal compression, ensuring rapid access to immediately relevant context. Recent interactions cache 1211 implements sliding window approach, where older thoughts gradually transition to more compressed formats or move to cloud storage based on configurable retention policies. Personalized knowledge base 1212 maintains thoughts representing user-specific knowledge, preferences, and recurring patterns identified across multiple sessions. Unlike recent interactions cache 1211 which preserves detailed token-level information, personalized knowledge base 1212 stores more abstracted representations focused on core concepts and relationships pertinent to user. User-specific adaptations 1213 captures customizations to general thought patterns based on user interaction history, including terminology preferences, reasoning approaches, and domain-specific variations that diverge from generalized patterns.

Generalized section 1220 of local device cache stores non-personal, broadly applicable thoughts that enhance offline capabilities without compromising privacy. Common topics cache 1221 maintains frequently accessed general knowledge applicable across multiple contexts, prioritizing storage based on usage frequency, user interests, and predictive pre-caching based on user behavior patterns. Reasoning patterns store 1222 contains abstract thought structures representing common reasoning frameworks, such as analysis methodologies, problem-solving approaches, and logical structures that can be applied across domains. Fallback knowledge base 1223 provides essential baseline knowledge for offline operation when network connectivity is unavailable, including fundamental concepts and broadly applicable information selected based on relevance to user's typical interaction patterns.

Second tier of architecture, user-specific cloud cache 1230, extends personal thought storage beyond limitations of mobile device while maintaining strict privacy boundaries. Complete history store 1231 maintains comprehensive record of user-generated thoughts across all interactions, enabling access to historical context beyond storage constraints of local device. Complete history store 1231 implements intelligent compression strategies where older thoughts transition to increasingly abstract representations while maintaining essential semantic content and relational links. Encrypted personal context 1232 secures sensitive user-specific information using encryption keys accessible only to specific user, ensuring personal data remains protected even within shared cloud infrastructure. Encrypted personal context 1232 stores thoughts containing personally identifiable information, private preferences, and confidential content with enhanced security measures beyond standard cache protections. Extended knowledge repository 1233 maintains broader collection of user-relevant thoughts that exceed local storage capacity, organized by topic domains, temporal relationships, and usage patterns to facilitate efficient retrieval when needed.

Third tier, global generalized cache 1240, enables knowledge sharing across multiple users without compromising individual privacy. Domain-specific knowledge clusters 1241 organize thoughts by subject areas, professional domains, or topic categories, enabling efficient retrieval based on prompt context. Domain-specific knowledge clusters 1241 may implement varying levels of specialization, from broadly applicable concepts to highly technical domain knowledge, with appropriate metadata to support context-aware retrieval. Common reasoning frameworks 1242 store generalized thought patterns representing widely used analytical approaches, problem-solving methodologies, and logical structures independent of specific content domains. These frameworks serve as templates that can be instantiated with domain-specific knowledge to address particular prompts. Abstracted thought templates 1243 provide standardized reasoning structures derived from recurring patterns across multiple users, with all personal information and specific context removed. Abstracted thought templates 1243 maintain core logical flow and analytical value while eliminating any identifiable user connections or private information. Cross-domain connectors 1244 facilitate knowledge transfer between different subject areas by maintaining thoughts that establish relationships, analogies, or transformations between distinct knowledge domains, enabling more sophisticated reasoning across traditional domain boundaries.

Multiple users 1245 interact with global generalized cache 1240, both contributing to and benefiting from shared knowledge repository. Each user maintains separate local device cache 1200 and user-specific cloud cache 1230, while accessing common global generalized cache 1240, creating ecosystem where reasoning patterns can be refined and enhanced through collective usage while maintaining clear privacy boundaries.

Data flows within three-tier architecture follow specific patterns designed to balance efficiency, privacy, and knowledge sharing. When new thoughts are generated on mobile device, they are first stored in local device cache 1200, typically beginning in recent interactions cache 1211. Based on thought characteristics and privacy implications, thoughts may remain exclusively in personal section 1210 or, if containing no personal information, may also be stored in generalized section 1220 for offline access. When network connectivity is available, connectivity manager synchronizes appropriate thoughts with user-specific cloud cache 1230, prioritizing thoughts based on value, recency, and bandwidth availability. Personal thoughts with private information are exclusively synchronized to encrypted personal context 1232, while more general thoughts may be stored in extended knowledge repository 1233.

Thought generalizer periodically analyzes patterns across multiple users, identifying common reasoning structures that could benefit broader user base. When candidate patterns are identified, thought generalizer removes all personal information and specific context, creating abstracted versions suitable for global sharing. These generalized thoughts undergo validation for utility, quality, and privacy preservation before being added to global generalized cache 1240 in appropriate categories. Regular synchronization processes ensure most valuable generalized thoughts are available in local device cache 1200 of each user, even during offline operation, while respecting storage limitations of mobile devices.

Through this tiered architecture, system balances competing requirements of mobile environments, enabling efficient local operation with limited storage capacity, comprehensive personal history through cloud extensions, and knowledge sharing across users while maintaining strict privacy boundaries throughout thought lifecycle.

FIG. 13 is a method diagram illustrating the thought generalization process of mobile-optimized multi-stage LLM, in an embodiment. Candidate thoughts are collected from user interactions and filtered for privacy and consent, with explicit verification of opt-in status and removal of identifying metadata before processing continues 1301. Structural patterns across candidate thoughts are identified and clustered based on similar reasoning approaches, employing semantic analysis to recognize common logical structures, inferential patterns, and analytical frameworks regardless of specific content domain 1302. User-specific information and context are identified and removed from candidate thoughts through sophisticated detection algorithms that isolate personal references, specific examples, and contextual details while preserving underlying reasoning structures 1303. Core reasoning patterns are extracted and abstracted into generalized thought templates, transforming specific instances into broadly applicable structures that maintain logical integrity while increasing adaptability across different domains and user contexts 1304. Abstracted thought templates are validated for utility, privacy preservation, and quality through automated evaluation against benchmark scenarios, verification of complete anonymization, and assessment of logical coherence and inferential accuracy 1305. Validated thought templates are indexed and stored in global cache for future retrieval, with comprehensive categorization by domain, reasoning type, and application context to enable efficient discovery and retrieval when similar reasoning requirements are encountered in future prompts 1306.

Figure 14:
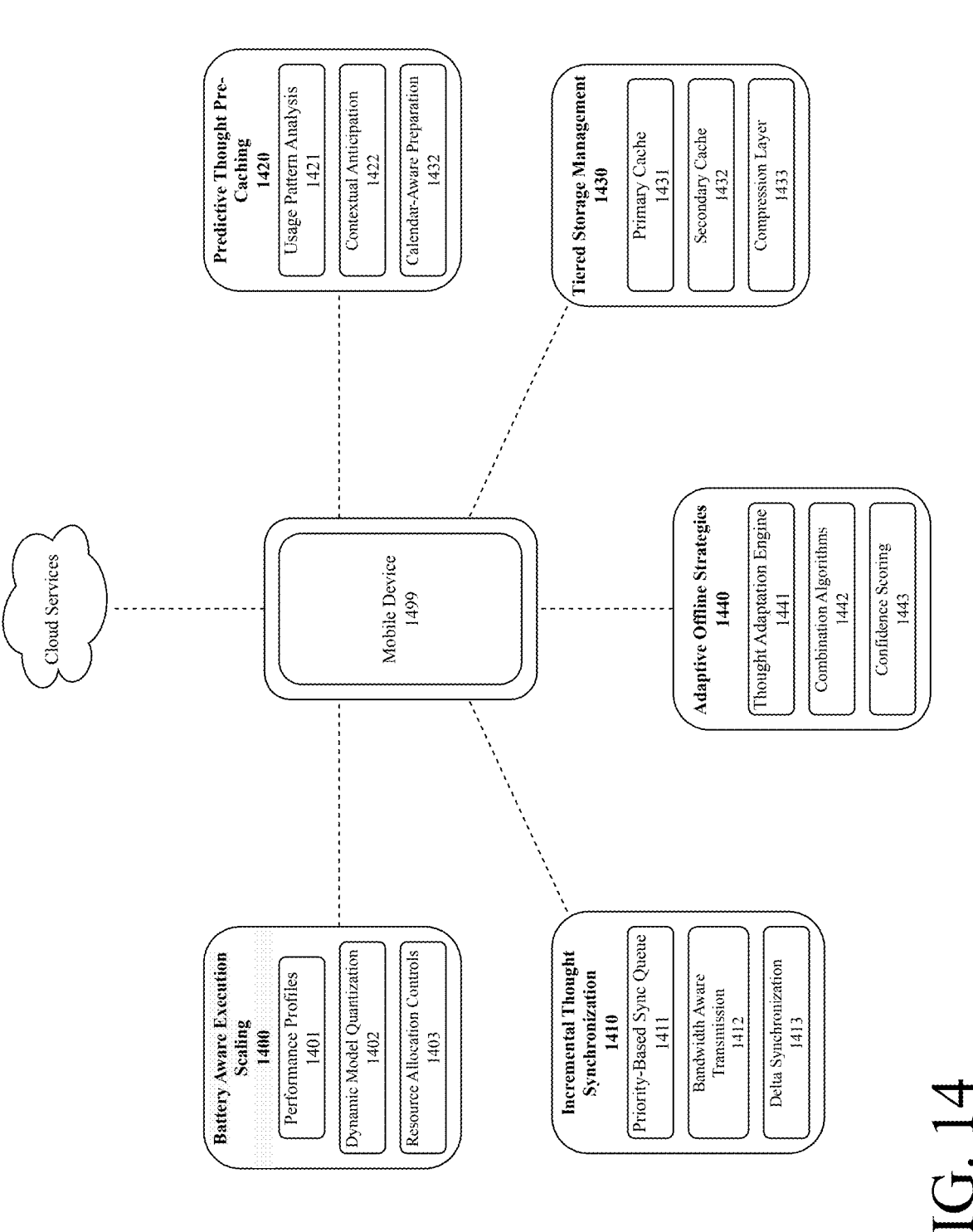
FIG. 14 is a block diagram illustrating exemplary architecture of mobile-specific optimizations.

FIG. 14 is a block diagram illustrating exemplary architecture of mobile-specific optimizations, in an embodiment. System architecture depicts mobile device 1499 with integrated optimization subsystems designed to address unique constraints of mobile computing environments while maintaining language model performance and user experience.

Battery-aware execution scaling 1400 implements dynamic adjustment of language model operation based on device power state. Performance profiles 1401 define multiple operational configurations for language model execution, ranging from full-capability mode when device is charging or at high battery levels to highly optimized, reduced-capability modes for critical battery conditions. Each profile specifies parameter settings including but not limited to inference batch sizes, attention mechanism configurations, and cache utilization thresholds. Dynamic model quantization 1402 adjusts numerical precision of model weights and activations based on current power constraints, implementing techniques such as weight sharing, mixed precision computation, and selective layer quantization to reduce power consumption with minimal impact on response quality. Resource allocation controls 1403 manage distribution of computational resources across system components, prioritizing essential operations during low-power states while deferring secondary functions such as background thought generation or cache optimization.

Incremental thought synchronization 1410 optimizes network usage for thought transfer between device and cloud caches. Priority-based sync queue 1411 maintains ordered list of thoughts awaiting synchronization, with priority determined by factors including thought utility, user activity patterns, and relationship to recent queries. Priority algorithms adjust dynamically based on observed usage patterns and explicit user behavior. Bandwidth-aware transmission 1412 monitors network conditions including connection type, signal strength, and available bandwidth to optimize synchronization timing and volume. During limited connectivity periods, synchronization focuses on highest-priority thoughts while deferring larger transfers to more favorable network conditions. Delta synchronization 1413 reduces data transfer requirements by transmitting only changed portions of thoughts rather than complete thought structures. For frequently accessed thoughts that undergo minor modifications, delta synchronization significantly reduces bandwidth requirements while maintaining thought consistency across local and cloud environments.

Predictive thought pre-caching 1420 anticipates user needs based on behavioral patterns and contextual cues, proactively downloading relevant thoughts from cloud caches to ensure availability during offline periods. Usage pattern analysis 1421 identifies recurring themes, topics, and query types in user interactions, building predictive models of future information needs. These models consider factors such as time-of-day variations, weekly patterns, and domain transitions to anticipate likely query domains. Contextual anticipation 1422 leverages device sensors and system information to identify situational triggers for specific thought requirements. Contextual triggers may include location changes, scheduled events, application usage patterns, or interaction with specific contacts, each associated with particular knowledge domains likely to be relevant in that context. Calendar-aware preparation 1423 integrates with device calendar functionality to identify upcoming events and appointments, pre-caching thoughts relevant to scheduled activities. Prior to business meetings, for example, system might prioritize downloading thoughts related to business topics, meeting participants, or relevant terminology into local cache.

Tiered storage management 1430 organizes cached thoughts across multiple storage layers based on access patterns and device capabilities. Primary cache (hot storage) 1431 utilizes fastest available memory for most frequently accessed thoughts and active session data, typically implemented in RAM with optimized data structures for rapid retrieval. Hot storage contains thoughts currently in use or highly likely to be needed in immediate future based on session context and user activity. Secondary cache (warm storage) 1432 maintains frequently accessed thoughts not currently in active use, typically implemented in persistent storage optimized for read performance. Warm storage serves as intermediate layer between high-speed primary cache and more efficient compressed storage, balancing access speed with expanded capacity. Compression layer 1433 stores less frequently accessed thoughts in highly compressed formats to maximize storage efficiency. Compression strategies vary based on thought characteristics, with different approaches for factual knowledge, reasoning patterns, and contextual information. Compression layer implements progressive compression where thoughts transition to increasingly compressed representations based on access frequency and recency.

Adaptive offline strategies 1440 maintain system functionality during periods without network connectivity by transforming existing cached thoughts to address new prompts. Thought adaptation engine 1441 implements algorithms for modifying cached thoughts to fit current context when exact matches are unavailable. Adaptation techniques include generalizing specific examples, instantiating abstract patterns with available context, and transferring reasoning structures across domains. Combination algorithms 1442 synthesize new thoughts by merging elements from multiple cached thoughts, identifying complementary components that together address requirements not fully covered by any single cached thought. Combination approaches include sequential chaining for process-oriented thoughts, hierarchical integration for conceptual frameworks, and parallel synthesis for multi-aspect problems. Confidence scoring 1443 evaluates reliability of adapted thoughts, providing transparency about potential limitations when operating with transformed knowledge rather than directly applicable cached thoughts. Confidence scores consider factors including similarity between original and current context, degree of transformation applied, and historical success rates of similar adaptations.

Mobile-specific optimizations cooperate through integrated operation coordinated by central optimization controller. When device enters low-battery state, battery-aware execution scaling 1400 activates reduced-power profile, triggering adjustments across other optimization subsystems. Tiered storage management 1430 may increase compression ratios to reduce storage power requirements, while incremental thought synchronization 1410 defers non-essential data transfers. Predictive thought pre-caching 1420 continuously operates in background, adjusting prioritization based on both user behavior patterns and current device state, ensuring essential thoughts remain available even during resource-constrained operation. This integrated approach ensures consistent user experience across varying device conditions while maximizing battery efficiency and maintaining core functionality during connectivity limitations.

Figure 15:
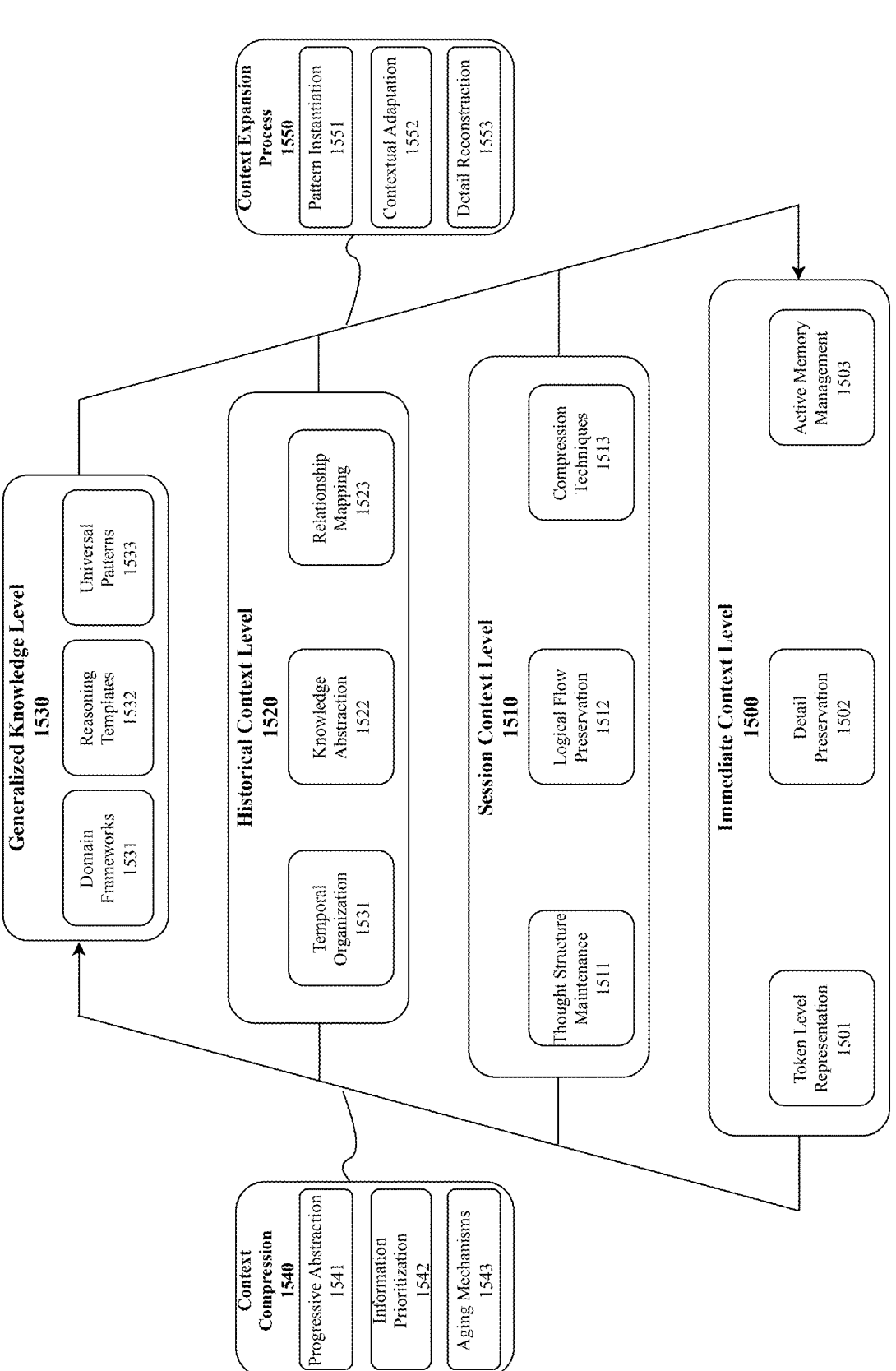
FIG. 15 is a block diagram illustrating exemplary architecture of hierarchical thought management for infinite context.

FIG. 15 is a block diagram illustrating exemplary architecture of hierarchical thought management for infinite context, in an embodiment. Hierarchical thought management architecture implements multi-level approach to context representation, enabling effectively unlimited contextual horizon while maintaining computational efficiency through progressive abstraction.

Immediate context level 1500 represents most recent interactions at highest fidelity, maintaining detailed information necessary for precise contextual understanding. Token-level representation 1501 preserves raw sequence information including exact wording, ordering, and formatting from recent prompts and generated responses. Token-level representation 1501 supports traditional attention-based processing where each token can attend to other tokens with position-sensitive weighting. Detail preservation 1502 maintains fine-grained semantic features, including disambiguation information, reference resolution data, and entity relationships established during recent interactions. Detail preservation 1502 ensures nuanced understanding of immediate context without requiring inference or reconstruction of implicit information. Active memory management 1503 continuously monitors token-level information, identifying patterns and relationships that can be consolidated while maintaining essential context. Active memory management 1503 implements sliding window approach where older information gradually transitions to more abstract representations based on aging thresholds and relevance metrics.

Session context level 1510 represents current interaction session at intermediate level of abstraction, maintaining structural and logical flow while reducing representational overhead. Thought structure maintenance 1511 preserves higher-level thought units rather than individual tokens, where each thought encapsulates complete reasoning step or conceptual unit. Thought-based representation significantly reduces context length compared to token sequences while maintaining reasoning integrity. Logical flow preservation 1512 maintains causal relationships, inferential links, and argumentative structures established throughout current session. By tracking logical dependencies rather than sequential token order, logical flow preservation 1512 enables more efficient context navigation based on reasoning patterns rather than linear history. Compression techniques 1513 reduce representational footprint of session context through methods including reference substitution, where repeated concepts are replaced with pointers to canonical representations; knowledge distillation, where complex explanations are condensed to core principles; and structural simplification, where redundant reasoning paths are consolidated into streamlined representations.

Historical context level 1520 captures cross-session knowledge and interaction patterns through highly abstracted representations focused on essential conceptual structures. Temporal organization 1521 maintains chronological relationships between interaction sessions and knowledge development, tracking concept evolution, preference refinement, and recurring themes across user history. Temporal organization 1521 enables retrieval of historical context based on temporal markers such as "similar to our discussion last week" or "continuing from previous conversation about machine learning." Knowledge abstraction 1522 converts detailed historical interactions into semantic knowledge structures representing core concepts, preferences, and established understanding. Unlike lower context levels that preserve specific wording or exact thought sequences, knowledge abstraction 1522 focuses on persistent information value independent of original presentation format. Relationship mapping 1523 maintains connections between knowledge elements across historical context, including concept hierarchies, causal relationships, preference structures, and domain associations. Relationship mapping 1523 supports graph-based context representation where connections between concepts can be navigated efficiently without requiring linear traversal of historical interactions.

Generalized knowledge level 1530 represents most abstract context tier, maintaining broadly applicable patterns and frameworks independent of specific user interactions. Domain frameworks 1531 provide structured knowledge representations for specific subject areas, including core concepts, standard terminology, and established relationships within disciplinary boundaries. Domain frameworks 1531 serve as background knowledge activated when relevant to current context, providing foundation for domain-specific reasoning without requiring explicit introduction. Reasoning templates 1532 capture abstract problem-solving patterns, analytical approaches, and logical structures applicable across multiple domains. Reasoning templates 1532 support efficient complex reasoning by providing pre-established thought structures that can be instantiated with specific context from current interaction. Universal patterns 1533 represent highest level of abstraction, capturing fundamental cognitive frameworks such as causal reasoning, analogical thinking, and classification structures that transcend specific knowledge domains. Universal patterns 1533 provide base-level context that shapes interpretation and reasoning across all interactions.

Context compression process 1540 manages transition of information between abstraction levels as context ages or becomes less immediately relevant. Progressive abstraction 1541 converts detailed representations to increasingly compressed forms through staged transformations. Information begins as token-level representation in immediate context, transitions to thought-based representation in session context, evolves into knowledge structures in historical context, and finally may contribute to refinement of generalized patterns at highest abstraction level. Information prioritization 1542 determines which elements maintain higher fidelity during compression based on factors including information uniqueness, structural importance, reference frequency, and explicit user indicators of significance. Information prioritization 1542 ensures that critical contextual elements receive preservation priority during compression, while redundant or peripheral information undergoes more aggressive abstraction. Aging mechanisms 1543 determine timing of transitions between abstraction levels based on combination of temporal factors and usage patterns. Aging mechanisms 1543 implement both time-based transitions where context gradually moves through abstraction levels based on chronological age, and activity-based transitions where frequently referenced information maintains lower abstraction level despite chronological age.

Context expansion process 1550 enables retrieval and utilization of compressed context when needed for current reasoning tasks. Pattern instantiation 1551 converts abstract patterns and templates into specific implementations relevant to current context. When reasoning requires historical knowledge stored in compressed form, pattern instantiation 1551 reconstructs specific instances from generalized representations based on current contextual cues. Contextual adaptation 1552 adjusts retrieved knowledge to current interaction requirements, accounting for changes in terminology, perspective, or focus between original context and current application. Contextual adaptation 1552 ensures that compressed information remains useful despite changes in conversational direction or conceptual framing. Detail reconstruction 1553 regenerates specific examples, explanations, or illustrations from compressed knowledge representations when detailed information is required. Detail reconstruction 1553 may leverage generative capabilities to recreate specific manifestations of compressed concepts when precise details were not fully preserved during compression.

Through this hierarchical approach, system achieves effectively unlimited context while maintaining computational efficiency. Rather than extending traditional token-based context windows, which scale linearly with context length, hierarchical representation distributes context across abstraction levels with appropriate compression at each level. This approach preserves immediate detail where most critical while maintaining essential knowledge and reasoning patterns from extended history without proportional computational burden. Context compression and expansion processes ensure fluid movement between abstraction levels as needed for specific reasoning tasks, enabling system to leverage entire interaction history while focusing computational resources on immediately relevant context.

Figure 16:
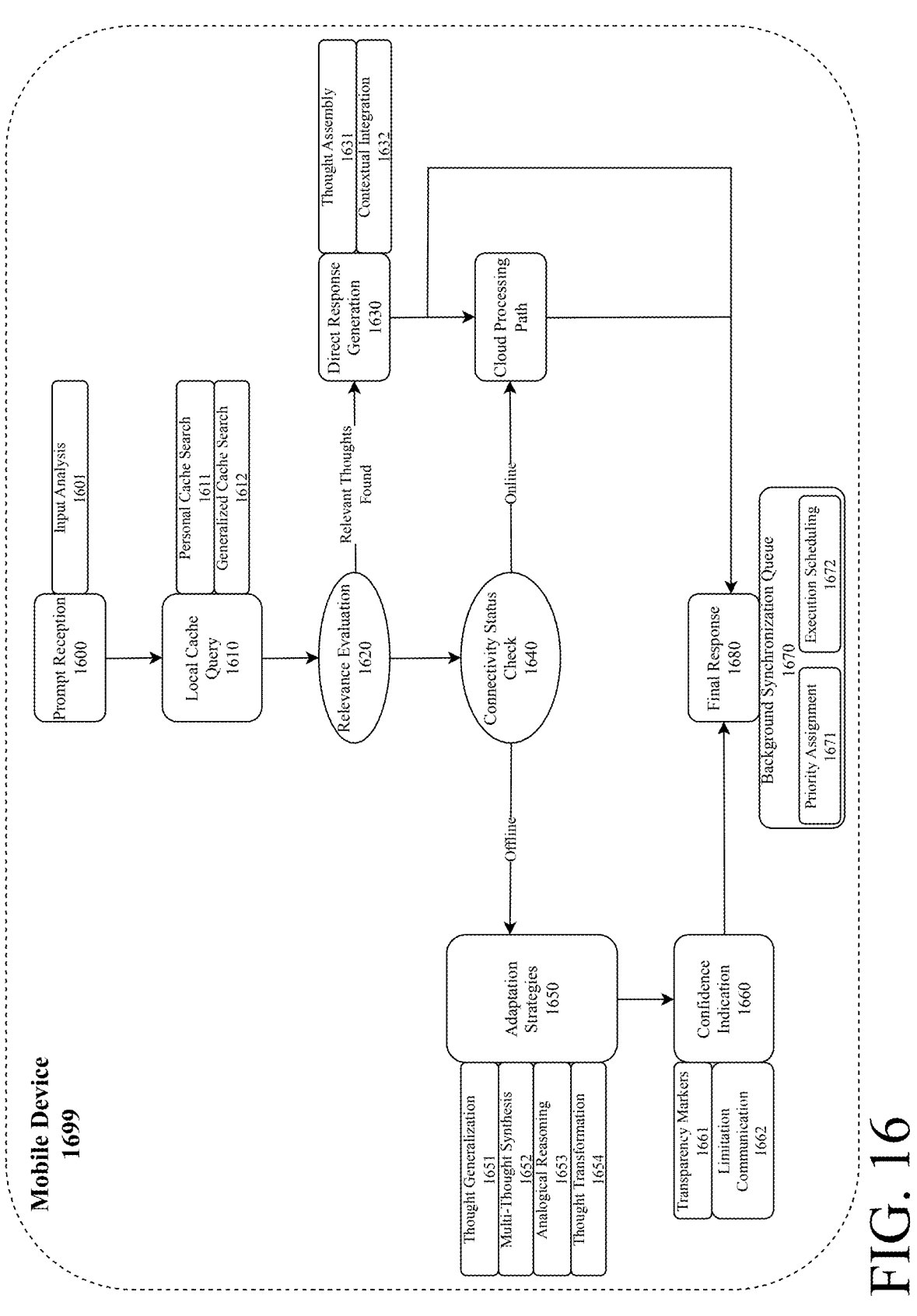
FIG. 16 is a block diagram illustrating exemplary architecture of offline functionality process flow.

FIG. 16 is a block diagram illustrating exemplary architecture of offline functionality process flow, in an embodiment. FIG. 16 depicts offline processing subsystems within mobile device 1699 enabling continued natural language processing functionality during periods without network connectivity.

Prompt reception 1600 serves as entry point for user input processing during offline operation. Input analysis 1601 performs initial processing of user prompt to identify key components, including primary subjects, requested actions, constraints, and contextual references. Input analysis 1601 operates using lightweight parsing techniques optimized for mobile execution, extracting structural elements and semantic features without requiring full language model inference. Intent recognition 1602 identifies purpose and objective behind user prompt, categorizing request into functional types such as information retrieval, analysis request, creative generation, or conversational exchange. Intent recognition 1602 utilizes compact classification models specifically optimized for mobile execution, enabling accurate intent identification with minimal computational overhead.

Local cache query 1610 searches device-resident thought cache for relevant content to address current prompt. Personal cache search 1611 examines user-specific thoughts stored on device, including previous interactions, personalized knowledge, and user-specific adaptations. Personal cache search 1611 prioritizes thoughts with established relevance to user's specific interests, terminology preferences, and interaction patterns. Generalized cache search 1612 examines non-personalized thoughts available in device cache, including common reasoning patterns, general knowledge structures, and domain-specific frameworks. Generalized cache search 1612 supplements personal cache results with broadly applicable thought patterns, particularly valuable when user explores new topics without established history. Vector similarity matching 1613 computes relevance scores between current prompt and cached thoughts using efficient vector comparison techniques optimized for mobile processors. Vector similarity matching 1613 implements dimensional reduction and quantization approaches that balance matching accuracy with computational efficiency for mobile execution.

Relevance evaluation 1620 assesses retrieved thoughts to determine applicability to current prompt. Similarity thresholds 1621 apply configurable criteria to determine if retrieved thoughts are sufficiently relevant for direct use, require adaptation, or are inadequate for current prompt. Similarity thresholds 1621 may implement multiple decision boundaries, using higher thresholds for direct application and lower thresholds for consideration in adaptation processes. Coverage assessment 1622 evaluates extent to which retrieved thoughts address all aspects of current prompt, identifying any gaps or unaddressed components that require additional processing. Coverage assessment 1622 maps thought content to prompt components, tracking fulfilled requirements and remaining gaps. Quality verification 1623 confirms retrieved thoughts meet acceptable standards for accuracy, coherence, and appropriateness before application to current prompt. Quality verification 1623 checks thought metadata including confidence scores, validation metrics, and usage statistics to ensure only reliable thoughts are utilized.

Direct response generation 1630 processes highly relevant cached thoughts to produce immediate responses. Thought assembly 1631 organizes selected thoughts into coherent sequence aligned with current prompt requirements. For multi-part queries, thought assembly 1631 arranges thoughts to progressively address each component while maintaining logical flow and conceptual consistency. Contextual integration 1632 combines cached thoughts with current prompt context to create cohesive response. Contextual integration 1632 resolves references, adapts terminology, and aligns perspective to create seamless integration between existing thought content and specific requirements of current interaction.

Connectivity status check 1640 verifies current network availability to determine appropriate processing path. During offline operation, connectivity status check 1640 routes processing to adaptation strategies rather than attempting cloud-based processing. Connectivity status check 1640 may implement periodic background verification to detect when connectivity is restored, enabling transition to online processing for subsequent interactions.

Adaptation strategies 1650 modify existing cached thoughts to address current prompt when exact matches are unavailable during offline operation. Thought generalization 1651 broadens specific cached thoughts to increased applicability. When cached thoughts contain specific examples or narrow applications of relevant concepts, thought generalization 1651 extracts underlying principles and patterns that can be applied more broadly to current context. Multi-thought synthesis 1652 combines elements from multiple partially relevant thoughts to construct more complete response. Multi-thought synthesis 1652 identifies complementary components across cached thoughts, resolving conflicts and establishing connections to create cohesive composite addressing current prompt requirements. Analogical reasoning 1653 applies thought patterns from one domain to structurally similar situations in different domains. Analogical reasoning 1653 maps relational structures between source domain (where cached thought originated) and target domain (relevant to current prompt), enabling knowledge transfer across conceptual boundaries during offline operation. Thought transformation 1654 modifies existing thoughts through controlled parameter adjustments to fit current context. Thought transformation 1654 applies techniques including perspective shifting, terminology adaptation, and constraint adjustment to align cached thoughts with specific requirements of current prompt.

Confidence indication 1660 communicates system certainty levels when operating with adapted thoughts rather than directly applicable matches. Transparency markers 1661 provide visual or textual indicators within response showing which portions derive from direct cache matches versus adaptations. Transparency markers 1661 may implement graduated indicators reflecting different confidence levels or adaptation approaches. Limitation communication 1662 explicitly notes constraints of offline operation when appropriate, particularly for queries that would benefit from real-time information or cloud-based processing. Limitation communication 1662 sets appropriate expectations while suggesting alternative approaches when full response quality cannot be achieved through offline processing alone.

Background synchronization queue 1670 maintains record of interactions for later synchronization when connectivity resumes. Priority assignment 1671 ranks queued interactions based on factors including user engagement level, novelty of domain, potential knowledge value, and adaptation confidence. Priority assignment 1671 ensures most valuable interactions receive synchronization priority when limited connectivity becomes available. Execution scheduling 1672 determines timing and sequence for processing queued interactions once connectivity is restored. Execution scheduling 1672 balances immediate synchronization needs with battery and bandwidth optimization, potentially deferring intensive processing until device is charging or connected to unmetered network.

Final response 1680 represents system output delivered to user through appropriate mobile interface. Final response incorporates content derived from direct cache matches or adaptation strategies, formatted according to user preferences and device constraints. Throughout offline processing flow, system maintains responsive user experience despite connectivity limitations, leveraging cached thoughts through combination of direct matching and sophisticated adaptation strategies. When connectivity resumes, background synchronization processes update cloud caches with offline interactions while retrieving updated thought content to enhance future offline capability.

Figure 17:
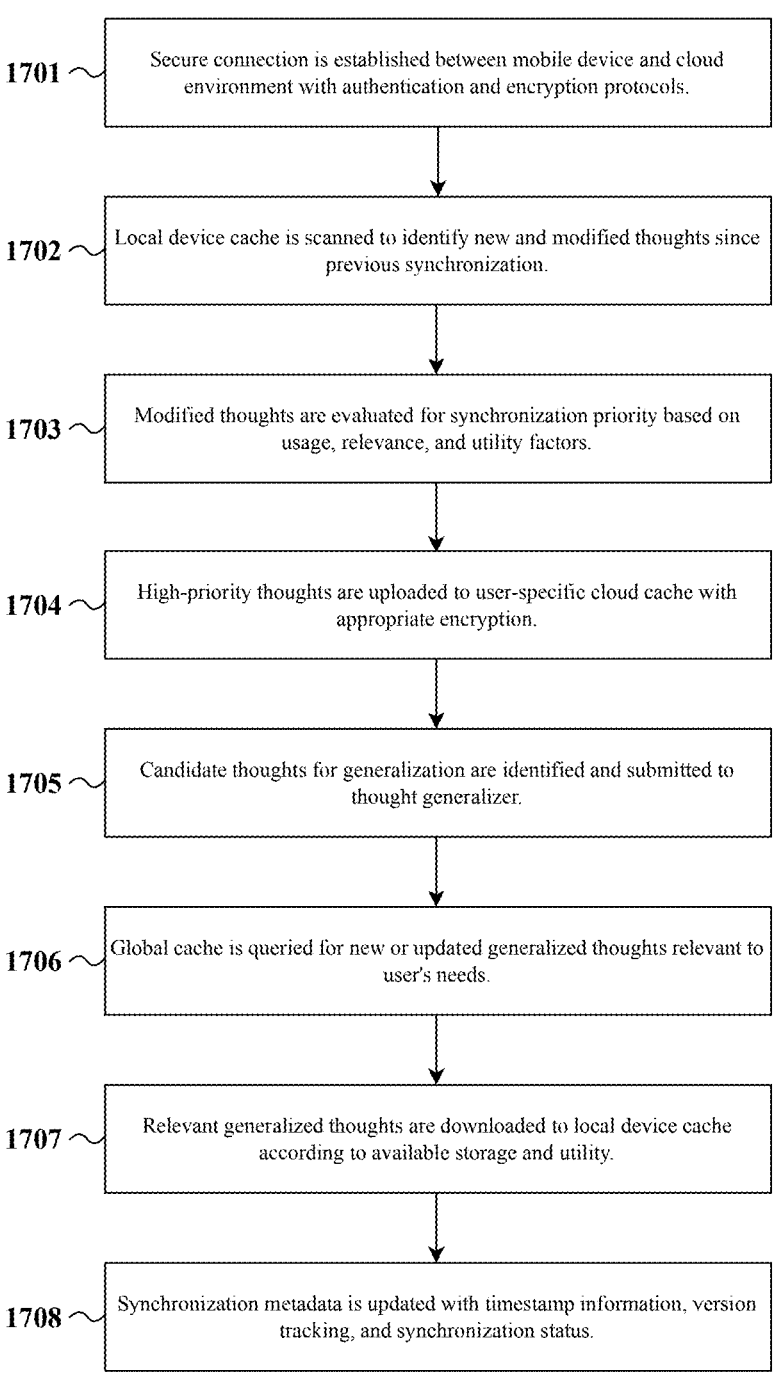
FIG. 17 is a method diagram illustrating the synchronization process between local device cache and cloud environments in mobile-optimized multi-stage LLM.

FIG. 17 is a method diagram illustrating the synchronization process between local device cache and cloud environments in mobile-optimized multi-stage LLM, in an embodiment. A secure connection is established between mobile device and cloud environment with authentication and encryption protocols to ensure data protection during transmission 1701. Local device cache is scanned to identify new and modified thoughts since previous synchronization event, using timestamp comparison and modification flags to determine which thoughts require synchronization 1702. Modified thoughts are evaluated for synchronization priority based on multiple factors including usage frequency, relevance to recent interactions, and estimated future utility to ensure most valuable thoughts are synchronized first during limited connectivity periods 1703. High-priority thoughts are uploaded to user-specific cloud cache with appropriate encryption, ensuring personal thoughts remain protected through user-specific encryption keys throughout transmission and storage 1704. Candidate thoughts for generalization are identified and submitted to thought generalizer for potential inclusion in global cache, applying preliminary privacy filters to prevent submission of thoughts containing personal information 1705. Global cache is queried for new or updated generalized thoughts relevant to user's interaction patterns and domains of interest, with relevance determination based on user history and predicted future needs 1706. Relevant generalized thoughts are downloaded to local device cache according to available storage capacity, device-specific constraints, and predicted utility, potentially replacing older or less relevant cached thoughts 1707. Synchronization metadata is updated with timestamp information, version tracking, and synchronization status to facilitate efficient future synchronization events and prevent redundant data transfers 1708.

In a non-limiting use case example of mobile-optimized multi-stage LLM, a professional frequently travels to remote locations with limited connectivity while needing consistent access to knowledge-intensive assistance. During a period with strong network connectivity, the professional queries the system about recent advancements in renewable energy technology. The prompt is processed by the mobile-optimized LLM, which generates detailed thoughts about solar efficiency improvements, grid storage innovations, and emerging wind turbine designs. These thoughts, along with the original prompt, are routed through the smaller language model to produce a comprehensive response that balances technical depth with practical applications.

The system automatically stores these renewable energy thoughts across its three-tier architecture. In the local device cache, the thoughts are organized with related concepts from previous interactions about environmental topics. In the user-specific cloud cache, the thoughts are encrypted and stored with the user's complete interaction history, maintaining secure access to personalized knowledge. Simultaneously, the thought generalizer analyzes these renewable energy concepts, removes user-specific references and contextual details, and abstracts the core reasoning patterns about technology evaluation and implementation considerations. These abstracted patterns are validated for both utility and privacy preservation before being added to the global generalized cache where they become available to other users seeking similar analysis frameworks.

The following day, the professional travels to a remote installation site with no network connectivity. Despite being offline, when they query about comparative cost analysis of different renewable options for the specific project, the system remains fully functional. The local router analyzes the prompt and queries the local cache, identifying previously cached thoughts about renewable technologies that relate to the current query but do not specifically address economic comparisons. The system employs adaptation strategies to transform these cached thoughts, generalizing specific technology assessments into broader evaluation frameworks, and then applying them to the economic domain through analogical reasoning. Multiple partially relevant thoughts about technology assessment criteria, efficiency metrics, and implementation considerations are synthesized into a coherent analysis framework specifically addressing cost comparison parameters.

Throughout this process, the battery optimizer monitors the device's power state, noting that battery level has dropped to 45%. In response, the system activates mid-range power conservation settings, implementing dynamic model quantization and adjusting resource allocation to prioritize prompt processing while deferring background operations. The confidence indication subsystem subtly marks portions of the response that derive from adapted rather than directly applicable thoughts, maintaining transparency while delivering valuable guidance.

When network connectivity is later restored, the connectivity manager initiates background synchronization of the offline interactions. The priority assignment subsystem identifies the cost analysis interaction as high-value based on the extensive thought adaptation performed and user engagement metrics, placing it at the top of the synchronization queue. The thought generalizer processes this interaction, recognizing that the cost comparison framework synthesized offline represents a valuable cross-domain application of technology assessment principles. After removing project-specific details, this generalized framework is validated and added to the global cache.

Over time, as the professional continues using the system across various locations with varying connectivity, the hierarchical thought management subsystem progressively compresses older interactions. Detailed token-level information from months-old renewable energy discussions transitions to the historical context level, where specific examples and explanations are condensed into core concept relationships and domain knowledge. The system maintains awareness of the professional's expertise and interests through this compressed context without requiring extensive storage resources, ensuring relevant information remains accessible even during extended offline periods.

Through this continuous operation across changing environments and connectivity states, the system demonstrates effective knowledge retention, offline adaptation capabilities, and efficient resource management while contributing to a broader collective knowledge base that benefits all users.

One skilled in the art would recognize numerous applications for mobile-optimized multi-stage LLM with generalized thought caching across diverse domains and use scenarios. Medical professionals could utilize this system during field operations in areas with limited connectivity, accessing diagnostic frameworks and treatment protocols even when disconnected from hospital networks. Field engineers could employ the system at remote installation sites to troubleshoot equipment issues using cached technical knowledge without requiring constant cloud access. Researchers conducting fieldwork in remote locations could maintain access to analytical frameworks and methodological approaches despite connectivity limitations. Financial advisors traveling between client locations could provide consistent analysis and recommendations regardless of network availability. Emergency response personnel could access critical decision-making frameworks during disaster scenarios when communication infrastructure is compromised. Legal professionals could maintain access to case analysis patterns and regulatory frameworks during courtroom proceedings where connectivity may be restricted. Educators in resource-constrained environments could deliver high-quality instructional content despite internet limitations. These applications demonstrate how the system's ability to maintain sophisticated reasoning capabilities in resource-constrained mobile environments, while efficiently sharing knowledge across users, addresses practical needs across numerous professional domains where consistent access to advanced language model capabilities provides significant value regardless of connectivity status or device limitations.

Hardware Architecture

Figure 18:
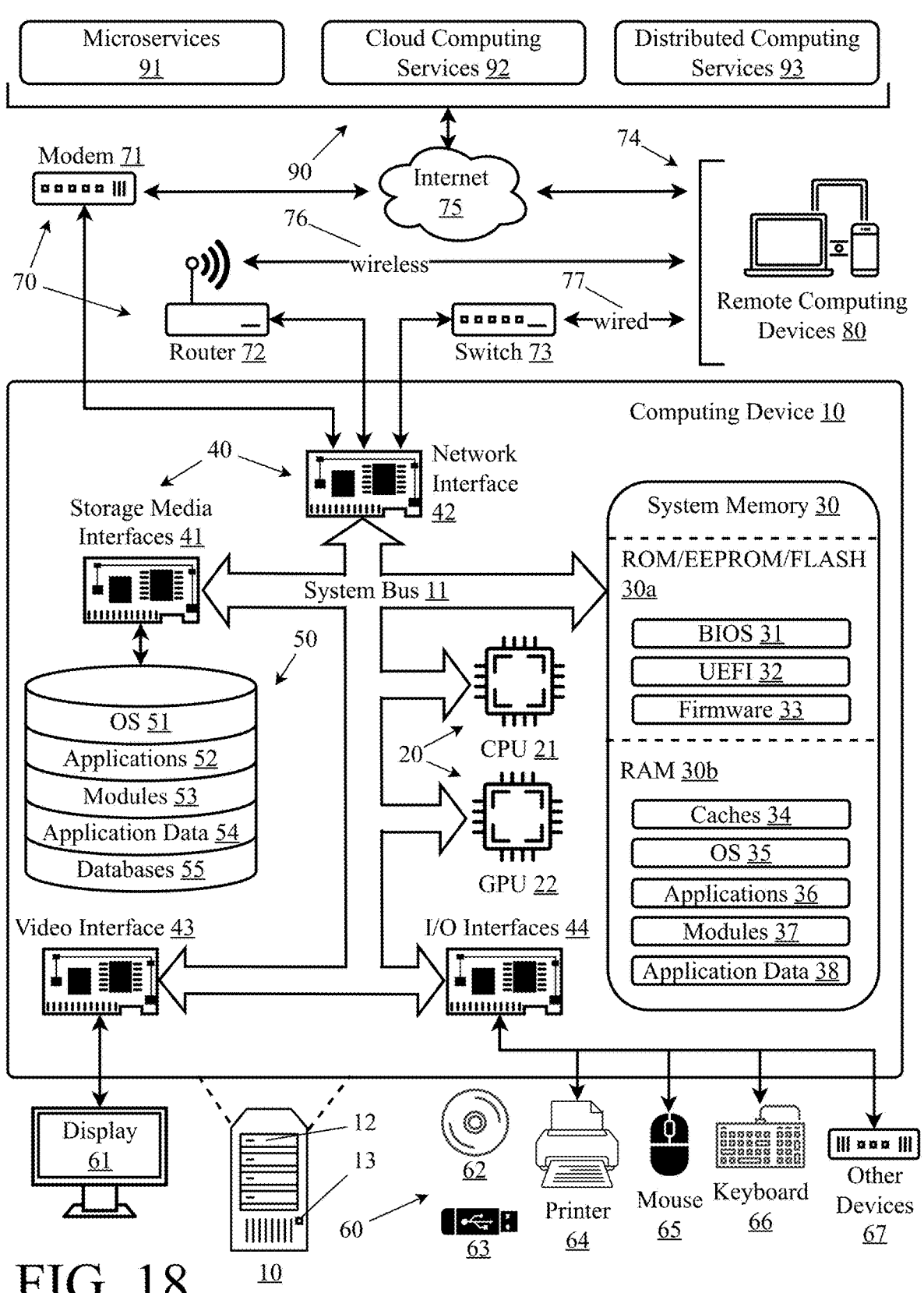
FIG. 18 illustrates an exemplary computing environment on which an embodiment described herein may be implemented.

FIG. 18 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Container provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Federated distributed computing services 93 provide large-scale processing using multiple interconnected computers or nodes to solve computational problems or perform tasks collectively. In federated distributed computing, the processing and storage capabilities of multiple machines are leveraged to work together as a unified system, even when different tiers or tessellations may have limited or even no visibility into the resources and processing layer up or downstream. Federated distributed computing services are designed to address problems that cannot be efficiently solved by a single computer or that require large-scale computational power and require dynamism and workload distribution for economic, security or privacy reasons not well supported by canonical distributed computing resources; e.g. most commonly cloud-based computing applications, resources or analytics. Federated DCG coordinated variants of these services enable superior decentralization and further enhance parallel processing, fault tolerance, and scalability by distributing tasks across multiple tiers or tessellations while enabling computing process dependency calculation with varying degrees of visibility, assurance and privacy or security based on constituent computing system, network, workload and user or provider needs and preferences as well as practical legal and regulatory concerns to include but not limited to data localization, national data transfer restrictions, privacy and consumer protections, wiretap/telecommunications monitoring requirements, encryption and data routing and intermediate processing restrictions.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer system comprising a hardware memory, wherein the computer system is configured to execute software instructions stored on nontransitory machine-readable storage media that:

receive a prompt from a user of a mobile device;

process the prompt into a plurality of corresponding thoughts using a first reasoning large language model optimized for mobile execution;

route both the prompt and the plurality of thoughts through a second large language model that has fewer parameters than the first large language model;

associate each corresponding thought in the plurality of corresponding thoughts to a portion of the prompt;

cache each associated corresponding thought in a multi-tier thought caching architecture comprising a local device cache, a user-specific cloud cache, and a global generalized thought cache, wherein a plurality of associated corresponding thoughts may be retrieved from the multi-tier thought caching architecture when the portion of the prompt they correspond to is present in a future prompt;

generate a response to the prompt by processing the plurality of thoughts and the prompt through the second large language model; and maintain full functionality when operating offline by adapting existing cached thoughts to address new prompts when no directly relevant thoughts are found and the mobile device lacks network connectivity.

2. The computer system of claim 1, wherein the computer system is further configured to execute software instructions stored on the nontransitory machine-readable storage media that analyze the prompt using a prompt analyzer to determine key concepts and requirements, query the multi-tier thought caching architecture to determine if similar thoughts exist for the determined key concepts, and synthesize new thoughts when the similar thoughts exist but do not fully address the prompt requirements.

3. The computer system of claim 1, wherein the local device cache of the multi-tier thought caching architecture stores both user-specific thoughts and generalized thoughts, the user-specific cloud cache of the multi-tier thought caching architecture securely stores the user's complete thought history encrypted with user-specific keys, and the global generalized thought cache of the multi-tier thought caching architecture stores abstracted reasoning patterns applicable across multiple users.

4. The computer system of claim 1, wherein the computer system is further configured to execute software instructions stored on the nontransitory machine-readable storage media that implement a thought generalizer that analyzes the plurality of corresponding thoughts generated across multiple users, removes user-specific information and context from the plurality of corresponding thoughts, abstracts a reasoning pattern into a generalized thought structure, and stores the generalized thought structure in the global generalized thought cache for access by all users.

5. The computer system of claim 1, wherein the computer system is further configured to execute software instructions stored on the nontransitory machine-readable storage media that implement battery-aware execution scaling that dynamically adjusts a complexity of the first large language model based on a power state of the mobile device.

6. The computer system of claim 1, wherein the computer system organizes the cached associated corresponding thoughts into a hierarchical structure to enable effectively unlimited context while managing computational resources efficiently, the hierarchical structure comprising progressive levels of abstraction from detailed token-level information in recent interactions to highly abstracted thought structures applicable across multiple contexts.

7. The computer system of claim 1, wherein adapting the existing cached thoughts to address the new prompts comprises a transformation process that modifies thought patterns from one context to fit requirements of a current prompt.

8. The computer system of claim 1, wherein the computer system is further configured to execute software instructions stored on the nontransitory machine-readable storage media that monitor a battery status of the mobile device and adjust a system behavior based on the battery status, including scheduling intensive processing and synchronization operations during charging periods.

9. The computer system of claim 1, wherein the computer system provides enhanced privacy through a hierarchical access control mechanism that maintains separation between personal thoughts in the user-specific cloud cache and anonymized thoughts in the global generalized thought cache.

10. The computer system of claim 1, wherein the computer system is further configured to integrate with sensors of the mobile device to incorporate contextual awareness into thought generation and retrieval processes.

11. A method comprising:

receiving a prompt from a user of a mobile device;

processing the prompt into a plurality of corresponding thoughts using a first reasoning large language model optimized for mobile execution;

routing both the prompt and the plurality of corresponding thoughts through a second large language model that has fewer parameters than the first large language model;

associating each corresponding thought in the plurality of corresponding thoughts to a portion of the prompt;

caching each associated corresponding thought in a multi-tier thought caching architecture comprising a local device cache, a user-specific cloud cache, and a global generalized thought cache, wherein a plurality of associated corresponding thoughts may be retrieved from the multi-tier thought caching architecture when the portion of the prompt they correspond to is present in a future prompt;

generating a response to the prompt by processing the plurality of corresponding thoughts and the prompt through the second large language model; and maintaining full functionality when operating offline by adapting existing cached thoughts to address new prompts when no directly relevant thoughts are found and the mobile device lacks network connectivity.

12. The method of claim 11, further comprising analyzing the prompt using a prompt analyzer to determine key concepts and requirements, querying the multi-tier thought caching architecture to determine if similar thoughts exist for the determined key concepts, and synthesizing new thoughts when the similar thoughts exist but do not fully address the prompt requirements.

13. The method of claim 11, wherein the local device cache of the multi-tier thought caching architecture stores both user-specific thoughts and generalized thoughts, the user-specific cloud cache of the multi-tier thought caching architecture securely stores the user's complete thought history encrypted with user-specific keys, and the global generalized thought cache of the multi-tier thought caching architecture stores abstracted reasoning patterns applicable across multiple users.

14. The method of claim 11, further comprising analyzing the plurality of corresponding thoughts generated across multiple users, removing user-specific information and context from the plurality of corresponding thoughts, abstracting a reasoning pattern into a generalized thought structure, and storing the generalized thought structure in the global generalized thought cache for access by all users.

15. The method of claim 11, further comprising implementing battery-aware execution scaling that dynamically adjusts a complexity of the first large language model based on a power state of the mobile device.

16. The method of claim 11, further comprising organizing the cached associated corresponding thoughts into a hierarchical structure to enable effectively unlimited context while managing computational resources efficiently, the hierarchical structure comprising progressive levels of abstraction from detailed token-level information in recent interactions to highly abstracted thought structures applicable across multiple contexts.

17. The method of claim 11, wherein adapting the existing cached thoughts to address the new prompts comprises a transformation process that modifies thought patterns from one context to fit requirements of a current prompt.

18. The method of claim 11, further comprising monitoring a battery status of the mobile device and adjusting a system behavior based on the battery status, including scheduling intensive processing and synchronization operations during charging periods.

19. The method of claim 11, further comprising providing enhanced privacy through a hierarchical access control mechanism that maintains separation between personal thoughts in the user-specific cloud cache and anonymized thoughts in the global generalized thought cache.

20. The method of claim 11, further comprising integrating with sensors of the mobile device to incorporate contextual awareness into thought generation and retrieval processes.

* * * * *